(12) United States Patent
Matsuo et al.

(10) Patent No.: US 6,337,365 B1
(45) Date of Patent: Jan. 8, 2002

(54) ELECTRONIC/ELECTRIC COMPONENTS USED IN CLEAN ROOM AND SUBSTRATE TREATMENT APPARATUS

(75) Inventors: Takenobu Matsuo; Tsuyoshi Wakabayashi, both of Kofu; Misako Saito, Nakakoma-gun; Sadao Kobayashi, Yokohama; Yoshihide Wakayama, Chigasaki; Masayuki Imafuku, Yokohama, all of (JP)

(73) Assignees: Tokyo Electron Limited; Taisei Corporation, both of Tokyo (JP)

( * ) Notice: Subject to any disclaimer, the term of this patent is extended or adjusted under 35 U.S.C. 154(b) by 0 days.

(21) Appl. No.: 09/381,667
(22) PCT Filed: Mar. 25, 1998
(86) PCT No.: PCT/JP98/01296
§ 371 Date: Sep. 24, 1999
§ 102(e) Date: Sep. 24, 1999
(87) PCT Pub. No.: WO98/42783
PCT Pub. Date: Oct. 1, 1998

(30) Foreign Application Priority Data

Mar. 25, 1997 (JP) ............................................. 9-071201

(51) Int. Cl.⁷ ............................................. C08L 91/06
(52) U.S. Cl. ...................... 524/277; 524/241; 524/242; 524/243; 524/244; 524/336; 524/351; 524/352; 524/335
(58) Field of Search ................................ 524/277, 351, 524/352, 335, 336, 241, 242, 243, 244

(56) References Cited

FOREIGN PATENT DOCUMENTS

| JP | 61-283640 | 12/1986 |
|---|---|---|
| JP | 3-217467 | 9/1991 |
| JP | 5-230350 | 9/1993 |
| JP | 6-220274 | 8/1994 |
| JP | 8-59955 | 3/1996 |
| JP | 9-52992 | 2/1997 |
| JP | 9-95581 | 4/1997 |
| JP | 9-95660 | 4/1997 |

OTHER PUBLICATIONS

Air Cleaning, vol. 33, No. 1, Apr. 1995 Toshiaki Fujii, "Surface contamination with organic substances contained in the air of clean rooms (in Japanese" p. 16–21.
Patent Abstracts of Japan, Onishi, Antistatic Film, vol. 12, No. 338, Sep. 12, 1988 & JP 63099254 A (Mitsubishi Petrochem) Apr. 30, 1988.
Patent Abstracts of Japan, Okunoyama, Antistatic Composition, vol. 13, No. 595, Dec. 27, 1989 & JP 01252667 A (Toshiba Chem Corp).
Patent Abstracts of Japan, Suzuki, Resin for Sealing Semiconductor, vol. 11, No. 124, Apr. 17, 1987 & JP 61261316 A (Hitachi Chem Co Ltd), Nov. 19, 1986.
Database WPI, Week 198710, Derwent Publications Ltd., London, GB; AN 67590 XP002136157 & JP 62019453 A (Mitsubishi Kasei Vinyl KK).

*Primary Examiner*—Edward J. Cain
(74) *Attorney, Agent, or Firm*—Pillsbury Winthrop LLP

(57) ABSTRACT

An electronic/electric part used in a clean room in which the atmosphere is controlled to process a substrate in a semiconductor device industry, which contains a resin base material and additives added to the resin base material. The additives contain one or more materials selected from the group consisting of an anti-electrostatic agent made of a nonionic compound of a molecular weight of 350 or higher, an anti-oxidizing agent made of a phenolic compound of a molecular weight of 300 or higher, a lubricant, a plasticizer, a fire retardant, and a water repellent. The additives hardly releases gaseous organic substances from the resin base material under a condition where the part is used.

14 Claims, 12 Drawing Sheets

ELECTRONIC/ELECTRIC COMPONENTS USED IN CLEAN ROOM AND SUBSTRATE TREATMENT APPARATUS

TECHNICAL FIELD

The present invention relates to electronic/electric parts and an apparatus for processing substrates, which are used in a clean room.

BACKGROUND ART

As the high increasing of semiconductor device integration, adsorption of organic substances to a substrate, especially silicon wafer, is becoming an additional problem except particles adsorption (for example, "Current Studies on Measurements of Gaseous Contaminants and their Removal Technologies" written by Fujii, Air Cleaning Vol. 32, No. 3, page 43 (1994), Japan Air Cleaning Academy).

According to the studies conducted by the authors of the present invention, even after the interior atmosphere of a clean room has been cleaned up at a high degree, various organic compounds such as aliphatic hydrocarbons, organic carboxylic esters, phenols or oxides thereof, and amines are detected from the surfaces of silicon wafers placed in the clean room. These organic compounds very much coincide with the additives added to resin base materials. Therefore, the inventors suspect that the source of generating these compounds may be electronic/electric parts such as electric cord coating and print wiring substrate.

Additives are used to impart various functions to the resin products, and they contain organic compounds of relatively low molecular weights. Therefore, these compounds tend to volatilize from the resin base material while in use. More specifically, aliphatic hydrocarbons are generated from a lubricant added to improve the extrusion ability, and organic carboxylic esters are generated from a plasticizer added to maintain the physical property. Further, phenols and oxides thereof are generated from an anti-oxidizing agent added to prevent the deterioration due to oxidization during the forming process or thereafter, and amines stem from an anti-electrostatic agent added to prevent the electrostatic charge-up. When these organic substances adhere to the surface of a silicon wafer, a problem such as the deterioration of the film quality of the gate oxide layer arises, resulting in the low production yield.

In the manufacturing step for the highly integrated semiconductor device, the internal atmosphere of the clean room is cleaned with use of a chemical filter. However, the adsorption of organic substances onto the surface of the substrate is not sufficiently prevented. Under these circumstances, there has been a demand, on the part of customers, for a technology capable of effectively preventing the adsorption of organic substances onto the surface of the substrate.

DISCLOSURE OF INVENTION

The object of this invention is to provide an electronic/electric part and a substrate processing apparatus, in which the amount of release (volatilization) of organic substances is suppressed or reduced while being used in a clean room.

The inventors of the present invention studied the components of the additives contained in the resin base materials that constitute electronic/electric parts for use in a clean room, as well as their molecular weights. They found some components that were not released as out-gases from the resin base material at the temperature at which they were used, and also the range of molecular weight of these components, thus achieving the present invention.

More specifically, the inventors found that when the molecular weight of an organic substance used as a component of an additive becomes larger, the volatility (the property that an organic substance is released as out-gas from the resin base material) becomes lower. At the same time, as the molecular weight becomes larger, the adsorbing ability to the surface of a substrate (the property of the substrate surface adsorbed with an organic substance physically or chemically) becomes larger in some cases. As a result, the amount of organic substances adsorbed to the silicon wafer increases as the molecular weight increases in the case where the molecular weight of the organic substance is small, and reaches the maximum value at a certain molecular weight. The present invention has been achieved on the basis of such a finding.

The present invention provides electronic/electric parts containing a resin base material and additives to be used in a clean room in which the atmosphere is controlled to process a substrate in semiconductor device industries. The electronic/electric parts are characterized in that the additives contain one or more materials selected from the group consisting of an anti-electrostatic agent of a organic nitrogen-containing nonionic compound having a molecular weight of 350 or higher, an anti-oxidizing agent of a phenol compound having a molecular weight of 300 or higher, a lubricant, a plasticizer, a fire retardant, and a water repellent, and that the additives do not easily release gaseous organic substances from the resin base material under a condition where the part is used.

The present invention further provides a substrate processing apparatus which is to be installed in a clean room wherein the atmosphere is controlled to process a substrate to manufacture a semiconductor device and which comprises an electronic/electric part used for supplying electricity or transmitting or receiving a signal. The apparatus is characterized in that the electronic/electric part contains a resin base material and additives added to the resin base material. It is also characterized in that the additives contain one or more materials selected from the group consisting of an anti-electrostatic agent of a nitrogen-containing nonionic compound having a molecular weight of 350 or higher, an anti-oxidizing agent of a phenolic compound having a molecular weight of 300 or higher, a lubricant, a plasticizer, a fire retardant, and a water repellent. Further, the additives hardly release gaseous organic substances from the resin base material under a condition where the part is used.

BEST MODE OF CARRYING OUT THE INVENTION

Examples of the present invention will now be described with reference to accompanying drawings.

Figure 1A:
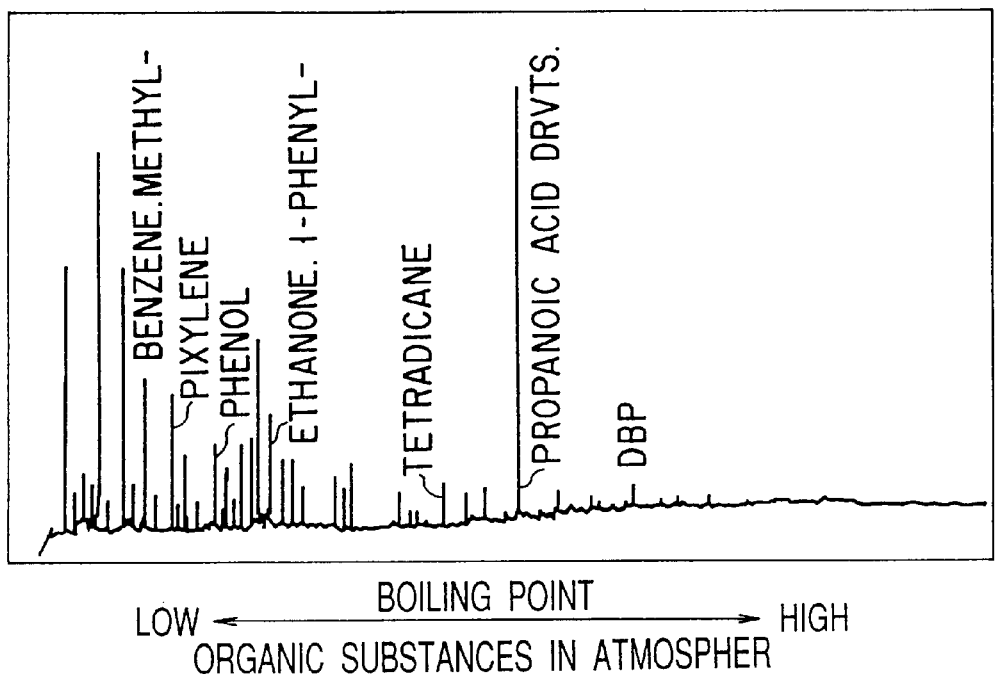
FIG. 1A is a diagram showing the result of measurement of organic substances in the atmosphere in the semiconductor manufacturing step.
Figure 1B:
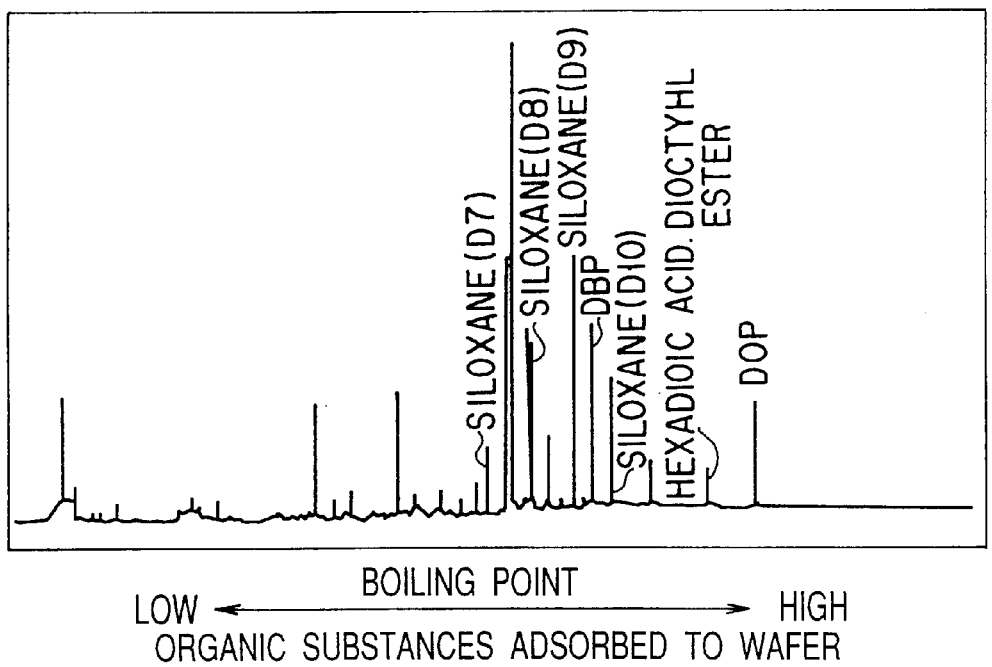
FIG. 1B is a diagram showing the result of measurement of organic substances adsorbed to a wafer in the semiconductor manufacturing step.

The inventors of the present invention analyzed organic substance contained within the atmosphere in the semiconductor manufacture step, and obtained the results indicated in FIG. 1A. Further, they analyzed organic substances adsorbed to a substrate (wafer) in the semiconductor device-manufacture steps, and obtained the results indicated in FIG. 1B. Regarding to the organic substances detected in the results shown in FIG. 1B, it was found that they are components of the ordinary additives (lubricant, plasticizer, anti-oxidizing agent, anti-electrostatic agent, and fire retardant) contained in the resin base material.

The anti-electrostatic agent made of a nitrogen-containing nonionic compound having a molecular weight of 350 or higher, and the anti-oxidizing agent made of a phenolic compound having a molecular weight of 300 or higher are of a type cannot be easily released from the resin base material. When both coexist, an $H^+$ group of the nitrogen-containing nonionic compound and an $OH^-$ group of the phenolic compound attract each other to bond to each other, and therefore they cannot be even more easily released from the resin base material as an out-gas.

With use of additives (lubricant, plasticizer, anti-oxidizing agent, anti-electrostatic agent, ultraviolet ray absorbent, fire retardant) containing an organic substance having a boiling point higher than those of these organic substances (for example, higher boiling point than those of DOP (dioctyl phthalate) and 6-di-t-butyl-p-cresol), i.e., low volatile, (less generating as out-gas), the generation of organic substances is suppressed as much as possible, thus greatly reducing the amount of organic substances adsorbed onto the substrate. Specifically, the additives that contain phthalate diester having a molecular weight of 400 or higher or an anti-oxidizing agent having a molecular weight of 300 or higher, are used.

Such organic substances are hardly released to the outside from the resin base material as gaseous organic substances, the generation of gaseous organic substances (out-gas) from the electronic/electric part made of resin base materials containing additives comprising the above organic substances, becomes significantly less, thereby suppressing the influence onto the substrate. The judgment as to whether or not an organic substance volatilizes from the electronic/electric parts and is adsorbed to the surface of the substrate, can be made using, for example, a wafer analyzer, which will be explained later.

The electronic/electric parts of the present invention are specifically parts of a computer, drive motor, transformer, parts of a power source (including an accessory for a power supply device), or a printed circuit board on which semiconductor elements are mounted, or the like. Further, the electronic/electric parts include not only circuits for supplying power or signals, but also their peripheral accessories, and they include sheaths for electrical cables, boxes or covers for electronic devices, semiconductor elements, semiconductor element packages, sealing members (gasket) and the like. The temperature condition in which the present invention is practically used is a temperature at which a harmful component gas (that is, a gaseous organic substance which is easily adsorbed to the surface of a wafer) is not substantially released when the power circuit structure portion of the baking unit receives radiant heat. In this case, there are various circumstances where the electronic/electric parts are used, and these parts may be used under a heated atmosphere or cooled atmosphere. Thus, the "temperature of use" is not limited to room temperature. For example, the sheath material for the electric cable for supplying power is heated, in some cases, to about 80° C. as it receives the radiation heat from the hot plate, and therefore it is desirable that a material which does not substantially release an organic component gas under a temperature condition of 80° C. or less should be used.

To the resin base material which constitutes these electronic/electric parts, an anti-electrostatic agent and an anti-oxidizing agent have been added as additives, and further at least one of a lubricant, plastisizer, fire retardant and water repellent. It should be noted that the parts of the present invention always include the anti-electrostatic agent and anti-oxidizing agent as additives. The anti-electrostatic agent is used to prevent the adsorption of particles to the parts, and the anti-oxidizing agent is an essential additive in the step of forming resin by injection. It is preferable that one or more of the lubricant, fire retardant and water repellent should be added the resin base material in accordance with the usage of the electronic/electric parts.

In the present invention, it is preferable that the lubricant should be at least one of aliphatic hydrocarbons having 20 or more carbon atoms, and higher alcohols having 18 or more carbon atoms. Further, it is particularly preferable that the main component of the lubricant should be at least one of paraffins and waxes such as microcrystalline wax, natural paraffin, synthesized paraffin and polyolefin wax, and higher alcohols such as synthesized branched higher alcohols respectively having 18, 20 and 24 carbon atoms and natural oleyl alcohol. Here, if the main component of the lubricant is an aliphatic hydrocarbon having 19 or less carbon atoms, for example, octadecane ($C_{18}H_{38}$), it volatilizes from the electronic/electric parts under an ordinary clean room temperature (23° C.), and it is adsorbed onto the substrate to contaminate the surface of the substrate. Therefore, it is not preferable.

In the present invention, it is preferable that the main component of the plasticizer should be a carboxylic ester having a molecular weight of 400 or higher (for example, a phthalate compound, a fatty dibasic acid ester compound, or a trimellitate compound), a polyester having a molecular weight of 400 or higher, and an epoxy compound having a molecular weight of 400 or higher. It is particularly preferable that the main component of plasticizer should be one of a phthalate compound such as isononyl phthalate (molecular weight of 418), octyldecyl phthalate (molecular weight of 419), isodecyl phthalate (molecular weight of 447), lauryl phthalate (molecular weight of 502) or tridecyl phthalate (molecular weight of 530); a fatty dibasic acid ester compound such as azelaic acid-di-2-ethylhexyl (molecular weight of 413) or sebacic acid-di-2-ethylhexyl (molecular weight of 427); a trimellitate compound such as trimellitic acid tris2-ethylhexyl (molecular weight of 547), trioctyl trimellitate (molecular weight of 547), trinonyl trimellitate (molecular weight of 589) or tridecyl trimellitate (molecular weight of 631); a polyester polymer compound obtained from a reaction between a dibasic acid such as adipic acid, azelaic acid, sebacic acid or phthalic acid and glycol or a glycerine, particularly, an adipate ester propyleneglycol compound or an adipate ester butyleneglycol, and that having a moecular weight of 2000 to 8000; and an epoxy compound such as an epoxy fatty acid ester compound (molecular weight of 400 to 500), or epoxy oil (molecular weight of about 1000).

Here, if the main component of the plasticizer is dibutyl phthalate (molecular weight of 278), dioctyl phthalate (molecular weight of 391) or adipic acid di-2-ethylhexyl (molecular weight of 371), each having a molecular weight of less than 400, it volatilizes from the electronic/electric parts under an ordinary clean room temperature (23° C.), is adsorbed onto the substrate to contaminate the surface of the substrate, and is therefore not preferable.

The anti-oxidizing agent should preferably be a phenolic compound having a molecular weight of 300 or higher. The anti-oxidizing agent of such a phenolic compound of such a high molecular weight should be at least one of a monophenolic compound such as stearyl-β-(3,5-di-t-butyl-4-hydroxyphenyl)propionate (molecular weight of 520.9); a bisphenolic compound such as 2,2'-methylene-bis(4-methyl-6-t-butylphenol) (molecular weight of 340.5), 2,2'-methylene-bis(4-ethyl-6-t-butylphenol) (molecular weight of 368.8), 4,4'-thiobis(3-methyl-6-t-butylphenol) (molecular weight of 358.5), 4,4'-butylidenebis(3-methyl-6-t-butylphenol) (molecular weight of 382.6); and a high-molecular phenolic compound such as 1,1,3-tris(2-methyl-4-hydroxy-5-t-butylphenol) butane (molecular weight of 544.8), 1,3,5-trimethyl-2,4,6-tris(3,5-di-t-butyl-4-hydroxybenzyl) benzene (molecular weight of 775.2), tetrakis [methylene-3-(3,5-di-t-butyl-4-hydroxyphenyl) propionate] methane (molecular weight of 1177.7) or bis[3,3'-bis(4-hydroxy-3-t-butylphenyl) butylic acid] glycol ester (molecular weight of 794.4).

Here, if the main component of the anti-oxidizing agent is 2,3-di-t-butyl-p-cresol (molecular weight of 220.4) or 2,6-di-t-butyl-4-ethylphenol (molecular weight of 234.2), each having a molecular weight of less than 300, it volatilizes from the electronic/electric parts under an ordinary clean room temperature (23° C.), is adsorbed onto the substrate to contaminate the surface of the substrate, and is therefore not preferable.

It is required that the anti-electrostatic agent should be a nitrogen-containing nonionic compound having a molecular weight of 350 or higher. It is particularly preferable that the nonionic compound is one or more selected from the group consisting of polyoxyethylene alkylamine, polyoxyethylenealkylamide, and N,N'-bis(diethyleneglycol)stearyl amine. It should be noted that in the main component of the anti-elecrostatic agent, the molecular weight is calculated in terms of the number of carbon atoms in its alkyl group and/or the number of bonds of polyoxyethylene.

Here, if the main component of the antistatic agent is N,N'-bis(2-hydroxyethyl)laurylamide which has a molecular weight of less than 350, it volatilizes from the electronic/electric parts under an ordinary clean room temperature (23° C.), and it is adsorbed onto the substrate to contaminate the surface of the substrate. Therefore, it is not preferable.

In the present invention, it is preferable that the main component of the fire retardant is a compound having a molecular weight of 300 or higher, except for phosphates. It should be noted that, with regard to the fire retardant, antimony trioxide, aluminum hydroxide, magnesium hydroxide or the like, which is not generated as a gaseous organic substance may be used.

The amount of the additive added to the resin base material can be set appropriately in accordance with its type. Further, when a plurality of-above-described additives are used, the effect of the present invention can be achieved if at least one additive satisfies the above-described conditions.

In the present invention, as the resin base material, poly(vinyl chloride), polypropylene, polyethylene, poly (methyl methacrylate), poly(ethylene terephthalate), poly (butylene terephthalate), polycarbonate, polyphenylene ether, polyallylate, poly(ether sulfone,), polysulfone, poly (phenylene sulfide), polyacetal, polystylene, polyamide, polyimide, poly (ether ether ketone), fluorine resin, epoxy resin, urethane resin, or the like may be used. The resin base materials used in the present invention include high-molecular materials such as paper.

In the case of the thermal plastic resin of the above-listed resin base materials, the before-mentioned additives are kneaded into the resin base material while heating. The material thus kneaded is formed with an extruding forming machine, an injection molding machine or the like, thus obtaining an electronic/electric part. For example, in the case of poly (vinyl chloride), the sheath provided on the outer side of an electrical cable by the extruding molding is an electronic/electric part. Meanwhile, in the case of thermosetting resin such as two-part epoxy resin, of the resin base materials, the before-described additives are mixed into the main agent or curing agent, and the main agent and the curing agent are mixed together to cure it. In this case, examples of the electronic/electric part are an IC package, glass epoxy substrate solder resist and the like. In the case where the resin base material is paper, paraffin paper or the like, in which paraffin was impregnated as a lubricant, is one example.

In the electronic and electric parts of the present invention, the substrate processed in the semiconductor device manufacturing step is contaminated if cyclic siloxane of a low molecular weight is released as out-gas. This is not desirable. Therefore, to suppress the generation of the cyclic siloxane having a low molecular weight, it is preferable to used a silicone resin (silicone oil) from which out-gas (siloxane of a low molecular weight) is released but in a small amount. For example, it is desirable to use silicone oil from which cyclic siloxane having 10 or less silicon atoms has been removed by a vacuum heat distillation method. The effect of the present invention can be obtained even if the above-described additives are added to such a silicone resin.

Further, the present invention provides a processing apparatus for processing an object that has electronic/electric parts necessary for the electric system. The apparatus is characterized in that the electronic/electric parts are made of a material containing a resin base material and at least one selected from the group consisting of a lubricant, plasticizer, anti-oxidizing agent, antistatic agent and fire retardant, and that the additives do not generate gaseous organic substances.

Next, examples of the present invention, which were carried out to illustrate the effect of the invention, will now be described.

Example 1

To 100 parts by weight of poly (vinyl chloride) (Mitsui Toatsu Chemicals, Inc.), 2 parts by weight of a lubricant (Nippon Oil Co., Ltd.), 10 parts by weight of a plasticizer (Daihachi Chemical Industries, Ltd.), 1 part by weight of an anti-oxidizing agent (Yoshitomi Pharmaceutical Industries, Ltd.), and 2 parts by weight of a fire retardant (Daihachi Chemical Industries, Ltd.) were added and kneaded while heating. Thus obtained material was subjected to extrusion molding to prepare a plurality of sheets having measurements of 100 mm×100 mm and a thickness of 2 mm.

Here, the main component of the lubricant was paraffin, the main component of the plasticizer was epoxy soybean oil, the main component of the anti-oxidizing agent was stearyl-β-(3,5-di-t-butyl-4-hydroxyphenyl) propionate, and the main components of the fire retardant were antimony trioxide and paraffin chloride having 20 or more carbon atoms.

A part of thus obtained sheet was cut off as a sample, and with use of the sample, organic substances of the additives, which were adsorbed to the wafer were analyzed with a Silicon Wafer Analyzer (the trade name of GL Science Co., Ltd., abbreviated as SWA hereafter).

The SWA is consisting of three main devices. More specifically, a trap unit to which adsorbed organic substances on a silicon wafer are desorbed and then recaptured in helium stream, a TCT (thermal desorption cold trap injector) unit for heating and desorbing the re-captured organic substances in the helium stream and then introducing them into a capillary tube cooled down with liquid nitrogen, so as to condense it, and a gas chromatograph/mass spectrum (GC/NS) device for analyzing the materials obtained by quickly heating the condensed organic substances within a helium stream. In the GC/MS device, the GC device separates each of the organic compounds to give a total ion chromatogram (TIC). As to each peak, the organic substance is qualitatively analyzed with the MS device. With the SWA, the amount of the organic substances adsorbed onto the wafer, and the types of these matters can be measured. Further, with the SWA, analysis of an order of several ng ($10^{-9}$ g) per a wafer can be performed.

The organic substances of the additives, which were adsorbed onto the wafer, were measured by the use of the SWA, in the following manner. First, a part of the aforementioned sheet and a 4-inch silicon wafer washed at the surface were placed in the same desiccator and spaced apart by several centimeters. The desiccator was closed with a lid, and the part of the sheet and the wafer left for several hours (for example, 6 hours). The wafer to which organic substances in the form of out-gas were adsorbed, was inserted to the SWA, in which the adsorbed organic substances were desorbed by heating the wafer at 315° C. under a helium stream, and they were captured once in the trap unit. Next, the captured organic substances were heated and desorbed in a helium stream, and then cooled down with liquid nitrogen in the TCT unit to condense them. Then, the cooled and condensed organic substances were heated to 280° C. in the helium stream, and the organic components were introduced into the GC/MS device.

Here, as the GC/MS device, G-3000/M-80B (trade name, Hitachi Ltd.) was used, and the measurement conditions were set to: 40° C.→Increasing temperature (10° C./min) →280° C.(left for 40 minutes). Further, use was made of a column having a length of 60 m and an inner diameter of 0.25 mm and coated with a methyl polysiloxane film having a thickness of 0.25 $\mu$m. Further, the ionization method of the MS device was an electron bombardment method, and the detection range was set to 0 to 600 m/z. In the qualitative analysis, the calibration curve was formed using hexadecane, and the concentration equivalent to that of hexadecane was used.

As a result, the amount of adsorption onto the wafer was 12 ng in a hexadecane-reduced amount. Further, each peak of TIC was qualitatively analyzed; however each peak was too minute to be analyzed qualitatively (since the adsorption of organic substances was very small in quantity). Therefore, the compounds of the additives did not very much volatilize from the sheet, and thus wafers should not be contaminated.

Example 2

A sheet was manufactured in the same manner as in Example 1 except that diisodecyl phthalate was used as the main component of the plasticizer, 1,1,3-tris(2-methyl-4-hydroxy-5-t-butylphenol) butane was used as the main component of the anti-oxidizing agent and ethoxyamine was used as the main component of the fire retardant.

With regard to this sheet, the amount of adsorption of organic substances onto the wafer was analyzed as in Example 1. The results indicated that the adsorption amount to the wafer was as small as 15 ng. Further, each peak of TIC was qualitatively analyzed; however each peak was too minute to be analyzed qualitatively (since the adsorption of organic substance was very small in quantity).

Comparative Example 1

A commercially available electrical cable covered with vinyl polychloride (Bandou Electrical Cable) was cut into a piece having a length of about 200 mm, and the copper cable was extracted therefrom, thus obtaining a sample of the vinyl polychloride portion having a weight of 20 g. Using the sample, the amount of organic substances adsorbed to the wafer was analyzed as in the above-described manner. The results indicated that the amount of adsorption to the wafer as 358 ng, which was very large. Further, the components of the adsorbed matters were analyzed, and DOP (dioctylphthalate) which is a component of the plasticizer and TBP (tributyl phosphate) which was a component of the fire retardant were found. To summarize, it was found that the gaseous organic substances generated from the additives in the resin base material which constituted the resin product, were adsorbed onto the wafer.

Example 3

Brominated bisphenol A-type epoxy resin (Yuka Shell Epoxy Co., Ltd.) was used as the main agent for the epoxy resin, and dicyanediamide (Nihon Carbide Co., Ltd.) was used as the curing agent, and they were dissolved into a solvent containing methylethylketone as the main component. The solution was impregnated to glass cloth of a 30 cm-square size (Nitto Boseki Co., Ltd.), and the cloth was heated in a nitrogen gas stream of about 80° C., so as to volatilize the solvent. Thus, an epoxy-impregnated glass cloth was obtained.

Then, eight glass cloth pieces were superimposed one on another, circuit board copper foils (Mitsui Metals Co., Ltd.) were placed on both surfaces thereof, and pressed by a hot press at a pressure of 60 kg/cm$^2$, in a temperature of 160° C. for 30 minutes. The additive to the glass cloth, used here was silicon oil which does not contain cyclic silixane of a low molecular amount, and which has 10 or less silicon atoms (Toray Dow Co., Ltd.). As the plasticizer, ditridecyl phthalate (molecular weight of 530) was used. Thus, a glass epoxy substrate was manufactured.

In the meantime, a solder resisting ink (Toagosei Chemical Industry Co., Ltd.) whose main agent was epoxyacrylate and whose curing agent was a benzophenone UV curing agent, was prepared.

Thus obtained glass epoxy substrate was cut to a size of 100 m-square. Then, the copper foil of the substrate was etched with an etching solution mainly containing iron chloride, and the surface was cleaned, followed by drying. Next, the solder resist was applied on the cleaned glass epoxy substrate, and was cured in a UV curing furnace under the conditions of room temperature, 300W of a UV lamp and a time of 30 seconds.

With regard to the sample described above, the amount of organic substances adsorbed onto the wafer was analyzed in the same manner as that of Example 1. The results indicated that the amount of adsorption onto the wafer was 16 ng, which was very small. Further, each peak of TIC was qualitatively analyzed; however each peak was too minute to be analyzed qualitatively (since the adsorption of organic substances was very small in quantity).

Comparative Example 2

With use of a commercially available glass epoxy substrate (Matsushita Electric Works, Ltd.), and a solder resist of Tamura Science Lab Co., Ltd., the amount of organic substances adsorbed to the wafer was analyzed in the same manner as that of Example 3. The results indicated that the amount of adsorption to the wafer was 210 ng, which was very large. Further, the adsorption components were analyzed, and DOP which was a component of the plasticizer and silixane which was a component of the silicone oil, were found. To summarize, it was found that the gaseous organic substances generated from the additives in the resin base material that constituted the resin product, were adsorbed onto the wafer.

Example 4

As an insulting paper sheet used for an electronic part, a paper sheet impregnated with a mixture obtained by adding 0.5 parts by weight of 2,2'-methylenebis (4-ethyl-6-t-butylphenol) (Yoshitomi Pharmaceutical Industries, Ltd.) and 2 parts by weight of tricresyl phosphate (Daihachi Chemical Industries, Ltd.) as the anti-oxidizing agent and fire retardant, respectively, to 100 parts by weight of the above-described silicone oil having 10 or less silicon atoms, was prepared.

Thus obtained silicone-impregnated insulation paper sheet was cut to a size of 200 mm-square, and the amount of organic substances adsorbed onto the wafer was analyzed in the same manner as that of Example 1. The results indicated that the amount of adsorption onto the wafer was 21 ng, which was very small. Further, each peak of TIC was qualitatively analyzed; however each peak was too minute to be analyzed qualitatively (since the adsorption of organic substance was very small in quantity).

Comparative Example 3

With use of a commercially available insulating paper sheet, the amount of organic substances adsorbed to the wafer was analyzed in the same manner as that of Example 4. The results indicated that the amount of adsorption to the wafer was 520 ng, which was very large. Further, the adsorption components were analyzed, and siloxane having about 6 silicon atoms, which was a component of the silicone oil, BHT (butylhydroxy toluene) which was a compound of the anti-oxidizing agent, and TBP (tributyl phosphate) which was a compound of the fire retardant, were found. To summarize, it was found that the gaseous organic substance generated from the additives in the resin base material which constituted the resin product, were adsorbed onto the wafer.

Example 5

To 100 parts by weight of polypropylene (Mitsui Toatsu Chemicals, Inc.) there were added 5 parts by weight of a lubricant (Nippon Oil Co., Ltd.), 3 parts by weight of a plasticizer (Daihachi Chemical Industries, Ltd.), 1 part by weight of an anti-oxidizing agent (Yoshitomi Pharmaceutical Industries, Ltd.), 2 parts by weight of an anti-electrostatic agent (Lion Fat and Oil Co., Ltd.), and 8 parts by weight of a fire retardant (Nihon Mining and Refining Co., Ltd.). The resultant mixture was kneaded while heating. The material thus obtained was subjected to extrusion forming to prepare a box, and plates having measurements of 100 mm×100 mm and a thickness of 2 mm were cut therefrom.

Here, the main component of the lubricant was a aliphatic hydrocarbon having 20 or more carbon atoms, the main component of the plasticizer was sebacic acid-2-ethylhexyl, the main component of the anti-oxidizing agent was stearyl-β-(3,5-di-t-butyl-4-hydroxyphenyl)propionate, the main component of the anti-electrostatic agent was N,N'-bis (diethyleneglycol) stearylamine, and the main components of the fire retardant were antimony trioxide (3 parts by weight) and paraffin chloride (5 parts by weight).

A part of thus obtained plate was cut off as a sample, and with use of the sample, organic substances of the additives, which were adsorbed to the wafer, were analyzed with the Silicon Wafer Analyzer (GL Science Co., Ltd., trade name) as in the Example described before.

The results indicated that the amount of adsorption onto the wafer was 18 ng in a hexadecane equivalent amount. Further, each peak of TIC was qualitatively analyzed; however each peak was too minute to be analyzed qualitatively (since the adsorption of organic substances was very small in quantity). Therefore, the compounds of the additives did not very much volatilize from the sheet.

Next, five test pieces each having a size of 45×45 mm were cut out from the sheet, and the electrostatic property of each piece was measured with an electrostatic measuring device, Static Honest Meter (trade name of Shishido Static Co., Ltd.). It should be noted that the electrostatic property was evaluated in terms of the electrostatic voltage and the half-life period.

The electrostatic measuring device is composed mainly of an applying portion for charging a test piece arbitrarily, a turntable for inducing a corona discharge, a voltage receiving portion for detecting the voltage of the test piece, and an amplifier.

First, a half-life period measuring device was connected to a synchrocope or a recorder, and the application voltage was set to ±10 kV. The distance from the tip end of the probe electrode of the applying portion to the turntable was adjusted to 20 mm, and the distance from the electrode of the voltage receiving portion to the turntable was adjusted to 15 mm. In the case where the test piece was extremely thick, the distances from the tip end of the probe of the applying portion and the electrode plate of the voltage receiving portion to the surface of the test piece were adjusted to 20 mm and 15 mm, respectively, and such data were indicated together with the results.

Next, after the test piece was de-electrified with use of a de-electrifying device, the test piece was placed in a test piece mount piece such that the surface faced upwards. Then, while rotating the turntable, a voltage of ±10 kV was applied for 30 seconds, and the application of the voltage was stopped. Further, while rotating the turntable as it was, the time required for the static charged-up voltage attenuating to ½ of the initial static voltage was measured. It should be noted that if the time period for the initial static charged up voltage attenuated to a negative value was 120 seconds or more, the measurement was stopped at 120 seconds. The rests of the four test pieces were measured in the same manner. The results indicated that in each case, the static property was 0V, and therefore the half-life period was not observed.

Example 6

A flat plate was prepared in the same manner as that of Example 5 except that as the main component of the lubricant, a aliphatic hydrocarbon having 21 or more carbon atoms was used, as the main component of the plasticizer, diisodecyl phthalate was used, and as the main component of the anti-oxidizing agent, 2-2'-methylene-bis(4-ethyl-6-t-butylphenol) was used.

With regard to the flat plate thus obtained, the amount of organic substances adsorbed to the wafer, was analyzed as in Example 5. The results indicated that the amount of adsorption onto the wafer was 17 ng, which was very small. Further, each peak of TIC was qualitatively analyzed; however each peak was too minute to be analyzed qualitatively (since the adsorption of organic substances was very small in quantity). Furthermore, the electrostatic property analyzed as in the above example, and the results indicated that the static property was 0V, and therefore the half-life period was not observed.

Comparative Example 4

A box member of a commercially available insulating paper sheet was cut to prepare a sample of 20 g, and then the amount of organic substances adsorbed to the wafer was analyzed in the above-described manner. The results indicated that the amount of adsorption to the wafer was 173 ng, which was very large. Further, the adsorption components were analyzed, so that DOP (dioctylphthalate) which was a substance of the plasticizers, 2,6-di-t-butyl-p-cresol which was a substance of the anti-oxidizing agents, and a hydrocarbon having 18 carbon atoms or less, which was a substance of the lubricants, were found. To summarize, it was found that the gaseous organic substances generated from the additives in the resin base material which constituted the electronic/electric part, was adsorbed onto the wafer.

Furthermore, the electrostatic property analyzed as in the above example, and the results indicated that the static property was 50V, and therefore the half-life period was 3 seconds.

Example 7

Figure 2:
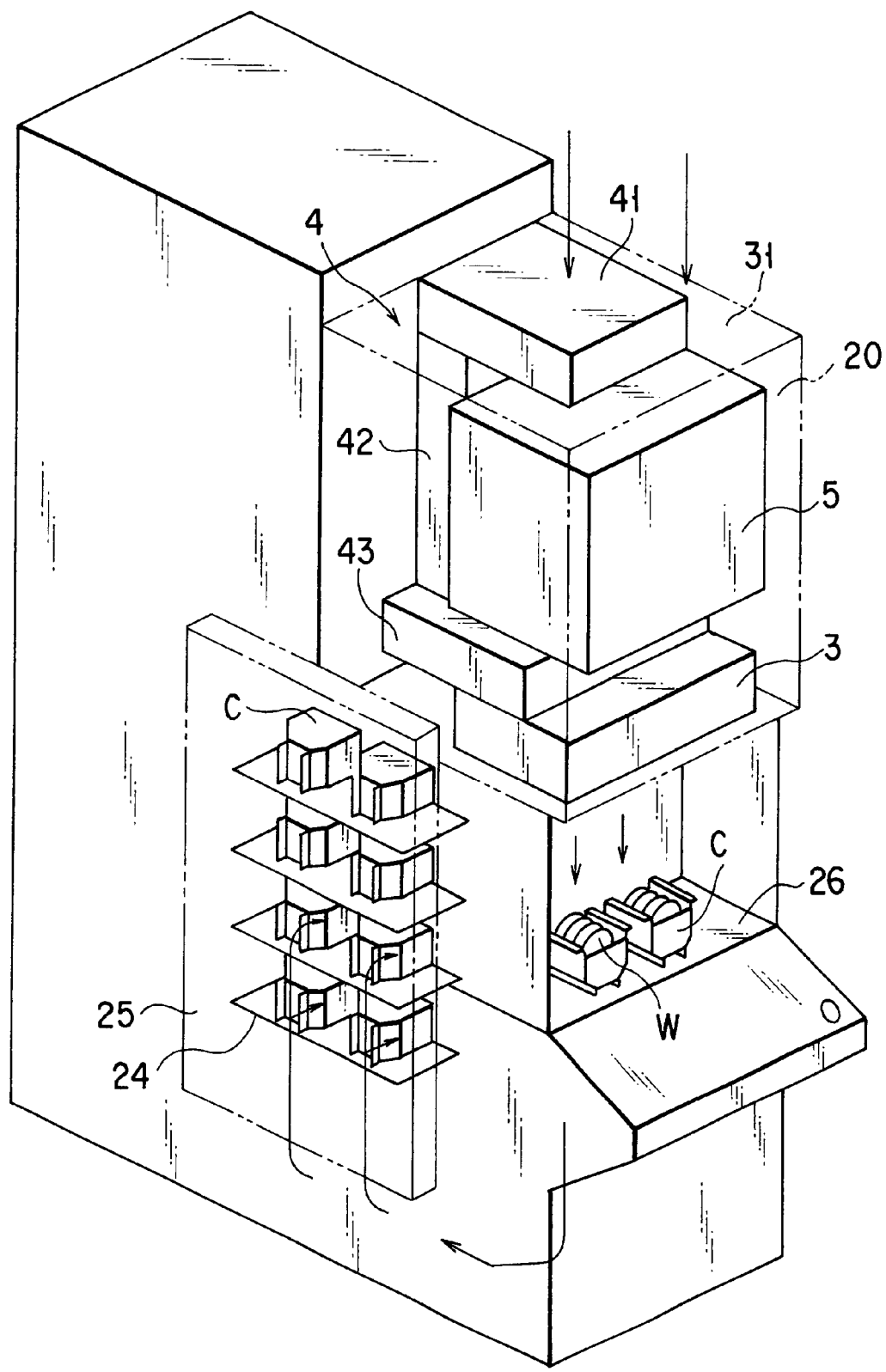
FIG. 2 is a perspective view of a vertical type thermal processing apparatus.
Figure 3:
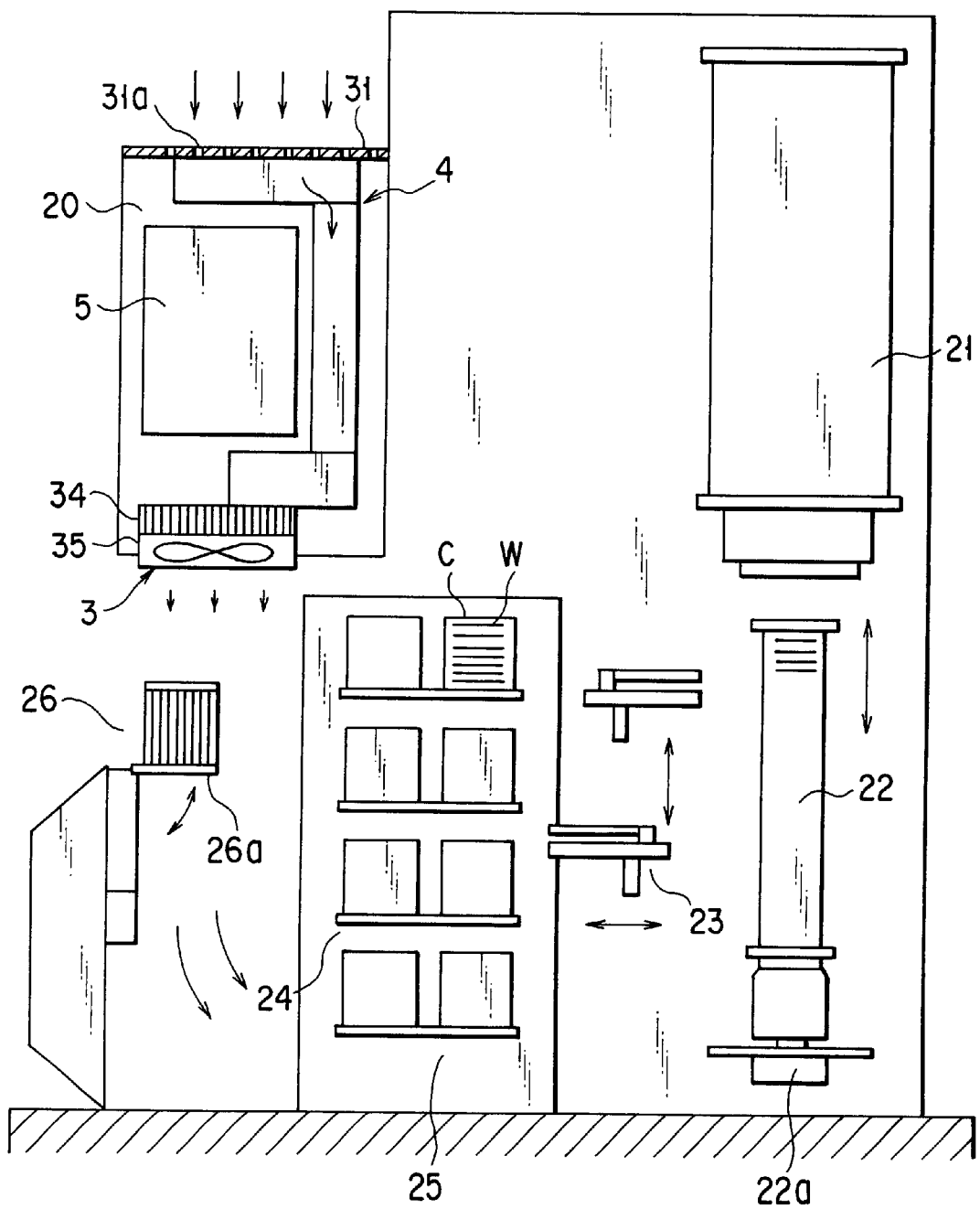
FIG. 3 is a perspective side view showing an interior of the vertical type thermal processing apparatus.

FIG. 2 is a perspective view showing an entire structure of a vertical-type thermal processing machine including electronic/electric parts, and FIG. 3 is a side view showing the internal structure thereof. In this machine, a thermal processing furnace 21 is provided in the inner section, and a wafer board 22 is placed on a boat elevator 22a in the lower section. In front of the wafer boat 22, transfer means 23 for transferring wafers and carriers, and a carrier cabinet 24 on which, for example, eight carriers C are placed, are provided. A wafer is passed between the wafer boat 22 and the carrier C by the transferring means 23.

The carrier cabinet 24 can move to the left and right in FIG. 3. In the rear surface side of the carrier cabinet 24, a filter unit 25 is provided. Further, in front of the carrier cabinet 24 (the left side in FIG. 3), a load/unload port 26 for the carriers C is provided, and each carrier C is passed between the load/unload port 26 and the carrier C cabinet 24 by the transferring means 23.

The load/unload port 26 constitutes a space in which wafers W are placed, and a ventilation area 20 is defined above the area from the load/unload port 26 to a slightly inner side (the right side in FIG. 3). The ventilation area 20 is surrounded with the plate of the main body of the machine, and the upper surface is covered by a part of the ceiling plate of the main body of the device. In the region 20, the filter unit 3, a duct member 4 and an electric installation unit 5 including electronic/electric parts are provided.

Next, the filter unit 3, the duct member 4 and the electric installation unit 5 will now be described with reference to FIGS. 2 to 4. In these figures, the reference numeral 31 indicates a ceiling plate which constitutes the upper surface of the ventilation area 20, and a great number of slits 31a are formed in the ceiling plate 31. Here, for convenience, an area 33 in which these slits 31a are made are divided into a first area A1, a second area A2 and a third area A3 as indicated with dotted lines in FIG. 4. Those of the slits 31a that are located in the first area A1 and the third area A3 correspond to inlets for taking in a cooling gas for cooling the electric installation unit, for example, clean air in the clean room, and exhaustion outlets for exhausting the air. The second area A2 corresponds to an inlet for taking a clean gas, for example, clean air in the clean room, into the duct member.

To the lower section of the ceiling plate 31, the duct member 4 is connected, which defines a flow path for allowing the air taken in from the slits 31a of the second area A2 to flow to the filter unit 3. In the duct member 4, a vertical path member 42 that defines a vertical air flow path is connected to, for example, the inner side of the lower end of a horizontal box member 41 (hereinafter called "upper side box member"). The inner side of the upper surface of a horizontal box member 43 (to be called "upper side box member" hereinafter) is connected to the lower end side of the vertical path member 42. Thus, they are arranged so that the overall structure has a shape of "U".

In the upper surface of the upper side box member 41, slits 41a which fit with the slits 31a are formed. The duct member 4 is arranged, with the upper surface of the upper side box member 41 overlapping with the slits 31a of the second area A2 of the ceiling plate 31. Further, the filter unit 3 for removing impurities from the air taken in from the slits 31a is connected to the lower end side of the duct member 4 such that a part of the lower surface of the lower side box member 43 overlaps with, for example, a part of the upper surface of the filter unit 3.

In the region 32 (shaded area) where the lower side box member 43 and the filter unit 3 overlap with each other, slits which are not shown in the figure formed in the lower surface of the lower side box member 43, so that the air passing in through the duct member 4 is absorbed into the filter unit 3. The other area on the upper surface of the filter unit 3, than the region 32 is covered by a cover 33 so that the air is not taken in.

The filter unit 3 is constructed by combining a filter portion 34 and a suction fan 35, and is structured so as to suck the air in the duct member 4 via the filter portion 34 by the suction fan 35. Similarly, the filter unit 25 located on the rear side of the carrier cabinet 24, is formed by combining a filter portion and a suction fan together. In this example, the duct member 4 and the filter unit 3 form a clean air flow path for allowing the clean air from which impurities are removed, towards the load/unload port 26 and the working area.

Further, in the space defined by the duct member 4 having a shape of "U", an electric installation unit 5 constructed by, for example, a combination of a power box necessary for the electrical system of the vertical-type heat processing machine, and an electrical installation unit containing electronic/electric parts such as an electronic part mounting substrate and cables, is provided.

Figure 4:
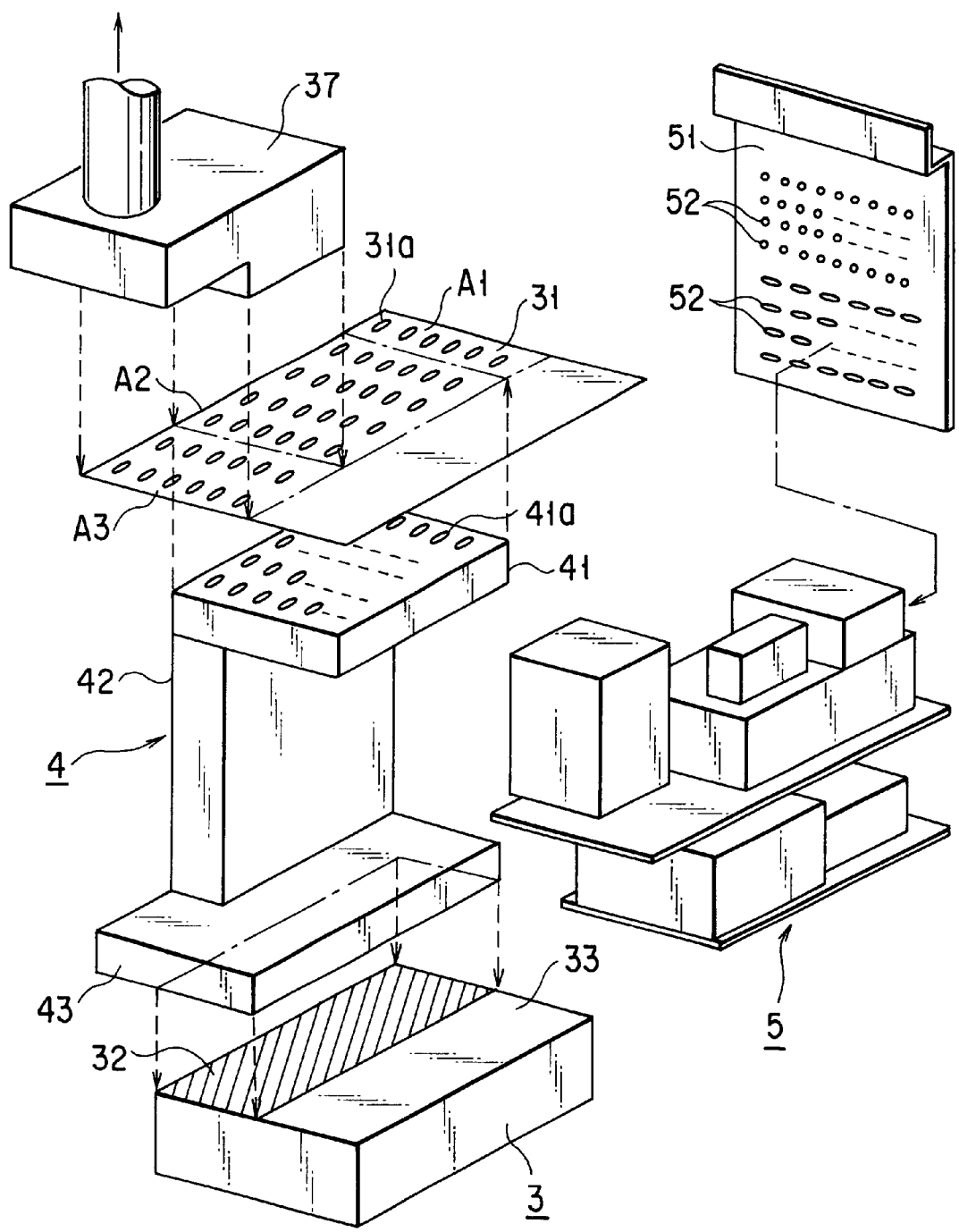
FIG. 4 is an exploded perspective view showing a main portion of the vertical type thermal processing apparatus.

As shown in FIG. 4, at the position near to the first area A1 side of the ceiling plate 31 from the electric installation unit 5, a partition plate 51 having a size corresponding to that of the electric installation unit 5 is provided to face the side portion of the electric installation unit 5. The partition plate 51 provides a ventilation area between the plate of the main body of the device and itself, on the side of the region where the electric installation unit 5 is placed. A great number of holes 52 each serving as a ventilation pore are made by punching. The partition plate 51 is designed to allow the air suctioned from the slits 31a of the first area A1 of the ceiling plate 31 to flow in the entire section of the electric installation unit 5, and those of the holes 52 located in the lower section are larger in size than those located in the upper section.

Further, a suction fan 36 is provided in the lower section of the third area A3 of the ceiling plate 31. The suction fan 36 draws the air from the atmosphere in which the electric supply unit 5 is placed, through the slits 31a of the area A3 is provided. To the upper side of the area A3, an exhaustion duct 37 for sending the air exhausted from the slits 31a to the exhaust path of the factory is connected.

The electronic/electric parts in the electric installation unit are made of a material containing a resin base material and additives which do not generate gaseous organic substances. Examples of these parts are a drive motor, transformer, part for a power supply, printed circuit board on which semiconductor elements are mounted, sheath for cable for the parts, box and cover for the electronic device, semiconductor element package, or sealing member (packing). Therefore, gaseous organic substances (out-gas) do not generate from the electronic/electric parts. Therefore, the adsorption of organic substances onto the wafer can be prevented, and the yield of the thermal process such as a process of forming a gate oxide film is significantly improved as compared to the conventional case.

Next, the results of the detection and measurement of the amount of organic substances adsorbed onto the surface of a substrate, after released from various electronic/electric parts as out-gases, will now be described with reference to FIGS. 5 to 18. The detection results described in the following were those obtained mainly by analyzing the conventional products as comparative examples.

Figure 5:
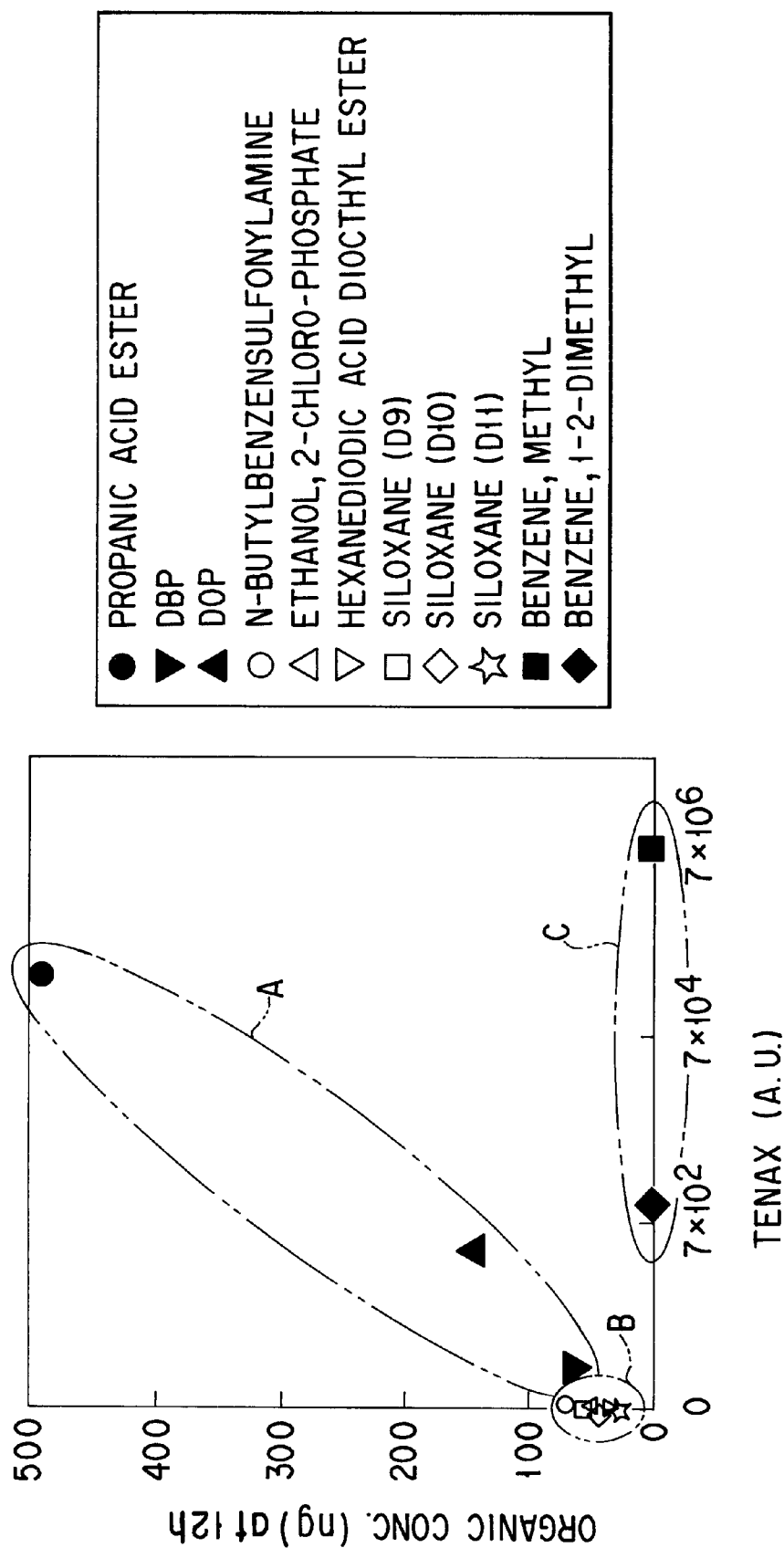
FIG. 5 is a characteristic diagram illustrating the result of measurement of a relationship between the concentration of each of the organic substances within the atmosphere and the amount of each substance adsorbed to the surface of the wafer, in a plot.

FIG. 5 is a graph illustrating the relationship between the peak area (A.U.), determined by analyzing the gas having passed TENAX (porous bead collecting agent) using a gas chromatography, and the amount (ng) of organic substances adsorbed onto the surface of the substrate. The peak area is plotted on the abscissa, and the amount of organic substances is plotted on the ordinate. As the value of the abscissa increases, the amount of the substances present in the atmosphere is larger, and as the value of the ordinate increases, the amount of the substances adsorbed onto the surface of the wafer becomes large. It should be noted that the amount of organic substances adsorbed is obtained by dividing the amount (ng) of organic substances adsorbed in the collecting agent (TENAX) when the gas is allowed to flow for 12 hours, by the area ($cm^2$) per one silicon wafer of 6 inches. The "TENAX" is an aggregation consisting of a great number of porous beads each having a polarity. All of these results were obtained by measurements made under the conditions of room temperature and atmospheric pressure.

In FIG. 5, a black circle indicates propanoic acid ester, a black triangle turned up-side-down for dibutylphthalate (DBP), a black triangle for dioctylphthalate (DOP), a white circle for N-butylbenzenesulfonylamine, a white triangle for ethanol 1,2-chloro-phosphate, a white triangle turned up-side-down for hexanedioic acid dioctylester, a white square for cyclicsiloxane having 9 silicon atoms (D9), a white rhombus for cyclicsiloxane having 10 silicon atoms (D10), a white star for cyclicsiloxane having 11 silicon atoms (D11), a black square for benzene methyl, and a black rhombus for benzene, 1,2-dimethyl. The results indicated that the organic compounds were divided into three groups A, B and C. More specifically, with regard to propanoic acid ester, DBP and DOP belonging to the group A, the amount of adsorption onto the surface of the wafer increases substantially in proportional to the concentration in the atmosphere, whereas with regard to N-butylbenzenesulfonylamine, ethanol 1,2-chlorophosphate, hexanediodic acid dioctylester, and cyclicsiloxane having 9 to 11 silicon atoms (D9, D10 and D11), they were detected to be present on the surface of the wafer as the adsorbed substances although they were not substantially detected within the atmosphere. This indicates that the organic compounds belonging to the group B each have a high adsorption property. On the other hand, benzene, methyl-(toluene) and benzene, 1,2-dimethyl-(xylene) were not at all detected on the surface of the wafer although the concentrations were high in the atmosphere. This indicates that the organic compounds belonging to the group C are not at all adsorbed onto the surface of the wafer.

As is clear from the above description, cyclicsiloxanes are very adsorptive to the surface (hydrophilic) of a silicon wafer, whereas benzene compounds of hydrocarbon groups are not substantially adsorbed onto the surface (hydrophilic) of a silicon wafer.

Figure 6:
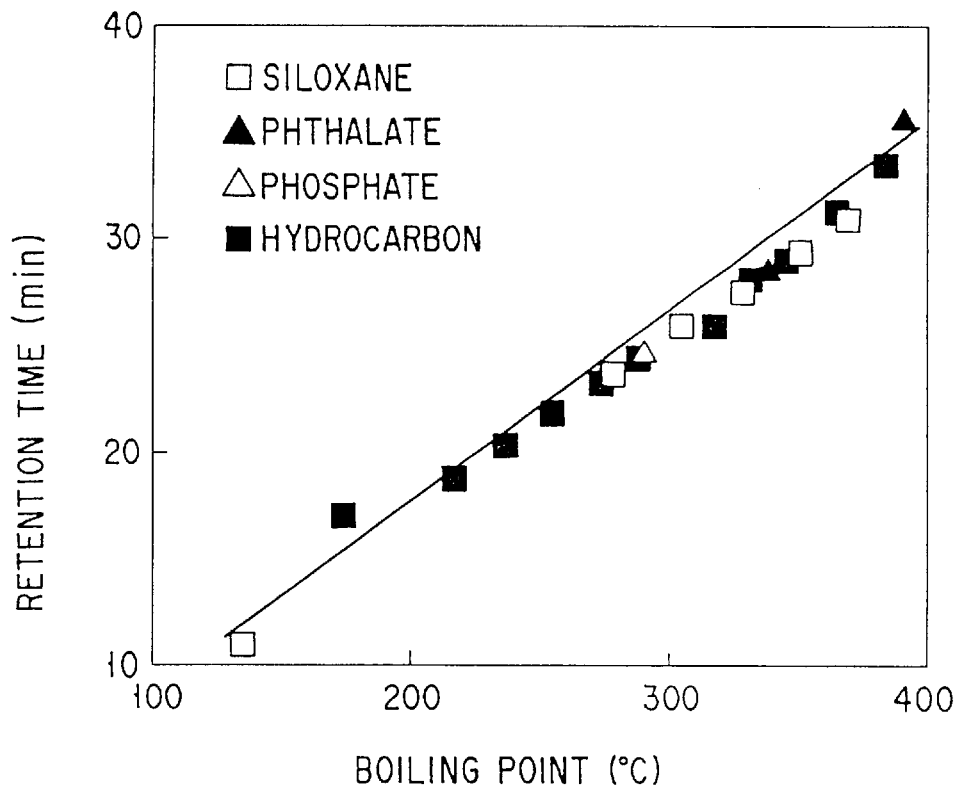
FIG. 6 is a characteristic diagram illustrating the result of measurement of a relationship between the boiling point (° C.) of each of the organic components within the atmosphere and the retention time of each component adsorbed to the surface of the wafer, in a plot.

FIG. 6 is a graph illustrating the results of the analyzing the relationship between the boiling point (° C.), taken in abscissa, and the retention time (min) of the gas chromatography, taken in ordinate. Here, the "retention time" indicates the time required for the component to be analyzed in the gas chromatography elutes. In the figure, a white square indicates siloxane, a black triangle for phthalic ester, a white triangle for phosphoric ester and a black square for hydrocarbon. As is clear from the figure, in a range of 100 to 400° C., the boiling point and the retention time are in a proportional relationship. According to the chemical engineering manual, for three properties, the "boiling point", "evaporation heat" and "adsorption heat", of an organic compound, the following relationships expressed by the formulas (1) and (2) below are known to be established. It should be noted that these formula (1) and (2) are empirical equations:

$$EQ = -2950 + 23.7BP + 0.02(BP)^2 \quad (1)$$

$$AQ = 1.6 \times EQ \quad (2)$$

where BP represents a boiling point (° C.), EQ for an evaporation heat (cal/mole) and AQ for an adsorption heat (cal/mole). From these equations, it can be induced that a high boiling-point organic compound has a high adsorption heat, and a low boiling-point organic compound has a low adsorption heat.

Figure 7:
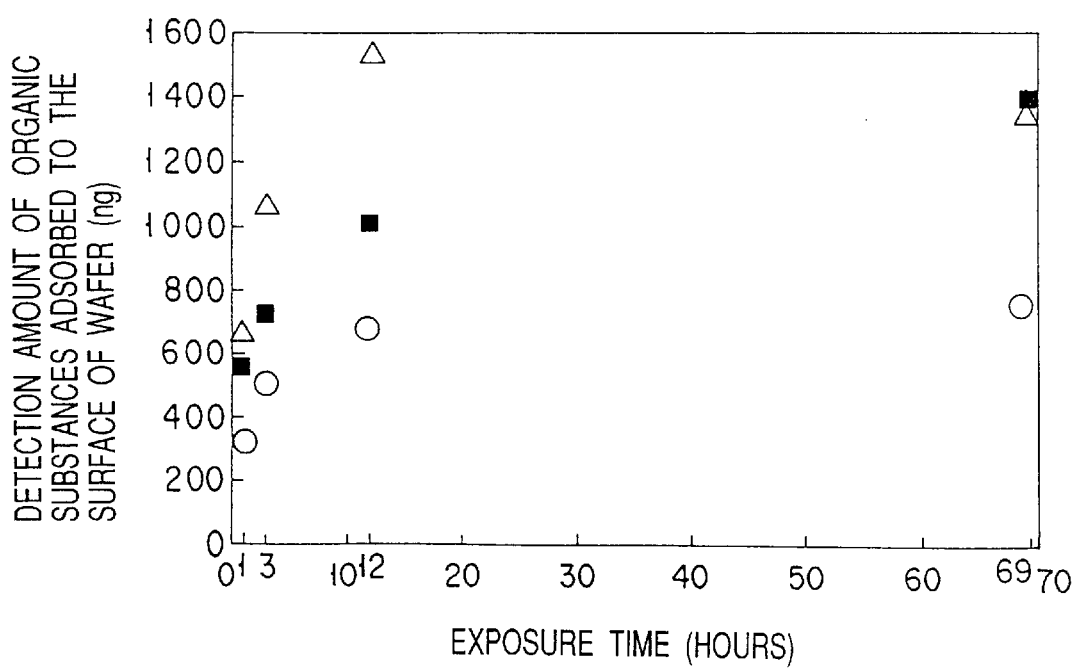
FIG. 7 is a characteristic diagram illustrating the result of measurement of a relationship between the exposure time (hours) of the surface states of each organic component and the detection amount of organic substances adsorbed to the surface of a wafer of a 6-inch diameter, in a plot.

FIG. 7 is a graph illustrating the results of the analysis on the relationship between the exposure time (hour), taken on abscissa, and the detection amount (ng) of organic substances adsorbed onto the surface of the 6-inch wafer, taken on ordinate, for various states of the surface of the wafer. Silicon wafers having surfaces of various states were exposed in a clean room equipped with a chemical filter, and they were analyzed. A silicon wafer which was wet-cleaned with a hydrofluoric acid solution was assigned as sample I, a silicon wafer having a silicon oxide layer formed by a thermal oxidation method was assigned as sample II and a silicon wafer which was dry cleaned with ozone upon the irradiation of ultraviolet rays, was assigned as sample III. In the figure, a white circle indicates the result of the amount of organic substances adsorbed onto sample I, a black square indicates the result of the amount of organic substances adsorbed onto sample II, and a white triangle indicates the result of the amount of organic substances adsorbed onto sample III. The amount of organic substances detected when the exposure time was set variously to 1 hour, 3 hours, 12 hours and 69 hours, was as follows. That is, for sample I, the amounts were 331 ng, 515 ng, 654 ng and 750 ng, respectively, sample II, the amounts were 562 ng, 724 ng, 1012 ng and 1397 ng, respectively, and sample III, the amounts were 665 ng, 1069 ng, 1531 ng and 1367, respectively. Thus, it was found that even in the clean room equipped with the chemical filter, a great amount of organic substances was adsorbed onto all of the samples I, II and III even they were exposed for a short period of time. Further, it was found that the amount of organic substances adsorbed was larger on the thermal oxide film surface (sample II) and dry-cleaned surface (sample III) than on the wet-cleaned surface (sample I). Note that it was further found that the amount of organic substance adsorbed reached a substantial saturation when the exposure time was 12 hours or longer.

Figure 8:
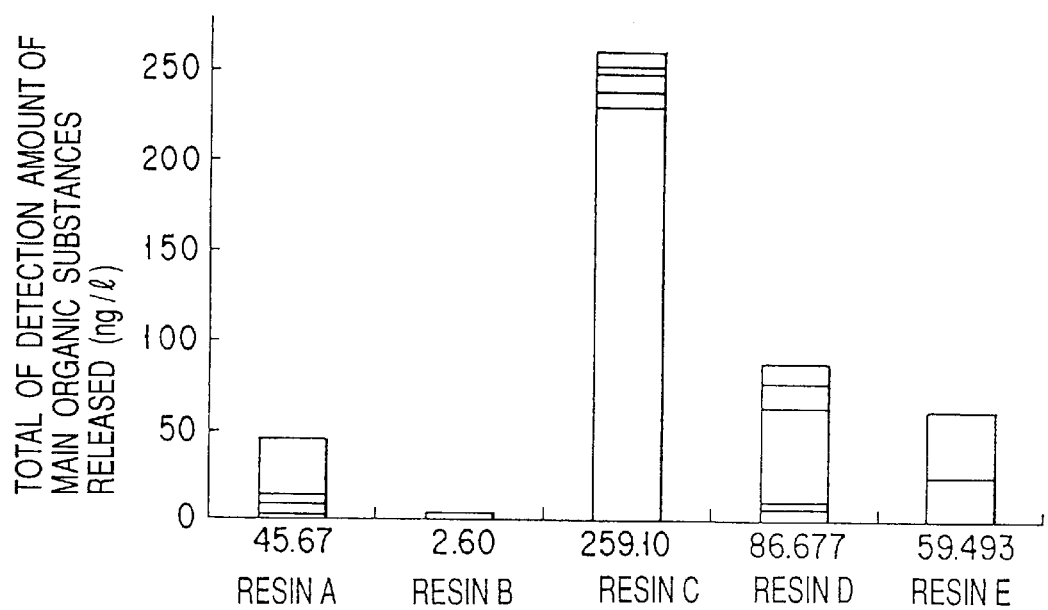
FIG. 8 is a graph illustrating the result of measurement regarding the total of the detection amount of main organic substance (5 components) released from each of the resin base materials, in a plot.

FIG. 8 is a graph illustrating the amount of out-gas released from each resin base material. The type of resin base material is plotted on the abscissa, while the total value (ng/liter) of the amount of the main organic substances detected among those released from the various resin base materials is plotted on the ordinate. The detection conditions for the out-gas were as follows. That is, the sample resins A to E were heated to 120° C. in the sealed container, and then clean air was supplied thereto. Thus, the amount of organic substances contained in 1 liter of the air was measured by the gas chromatography. The main organic substances are five of them, namely, butylhydroxytoluene (BHT), adipic acid ester, phthalic acid ester, phosphoric acid ester and siloxane. The total value of the amounts of the main organic matters of the resin A was 45.67 ng, that of the resin B was 2.60 ng, that of the resin C was 259.10 ng, that of the resin D was 86.677 ng, and that of the resin E was 59.493. Of these, the resin C released the greatest amount of gaseous organic substances. The most of the out-gas released was siloxane. By contrast, the amount of the gaseous organic substances released from the resin B was extremely small.

Figure 9:
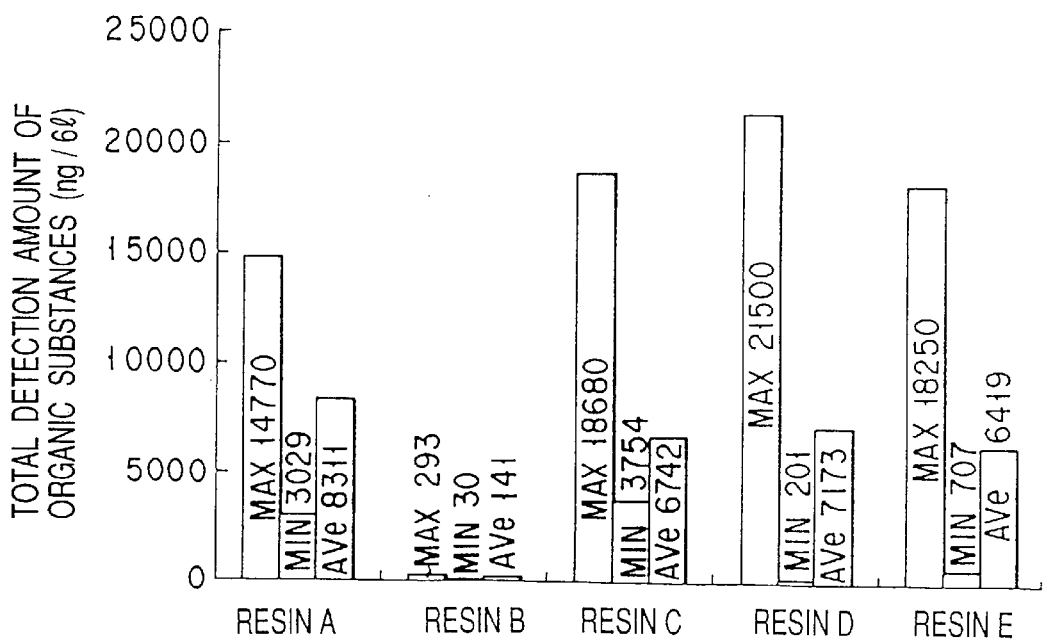
FIG. 9 is a graph illustrating the result of measurement regarding the total of the detection amount of organic substances (maximum, minimum and average) released from each of the resin base materials, in a plot.

FIG. 9 is a graph illustrating the total amount of out-gas released from respective resin base materials. The type of resin base material is plotted on the abscissa, while the maximum, minimum and average values of the total detection amount (ng/6 liters) of organic substances released from each resin base material are plotted on the ordinate. The detection conditions for the out-gas were as follows. That is, the sample resins A to E were heated to 120° C. in the sealed container, and then clean air was supplied thereto. Thus, the amount of organic substances contained in 6 liter of the air was measured by the gas chromatography. The maximum, minimum and average values of the total of the amounts of the organic substances detected for the resin A were 14770 ng, 3029 ng and 8311 ng, respectively, those of the resin B were 293 ng, 30 ng and 141 ng, respectively, those of the resin C were 18680 ng, 3754 ng and 6742 ng, respectively, those of the resin D were 21500 ng, 201 ng and 7173 ng, respectively, and those of the resin E were 18259 ng, 707 ng and 6419 ng, respectively.

Figure 10:
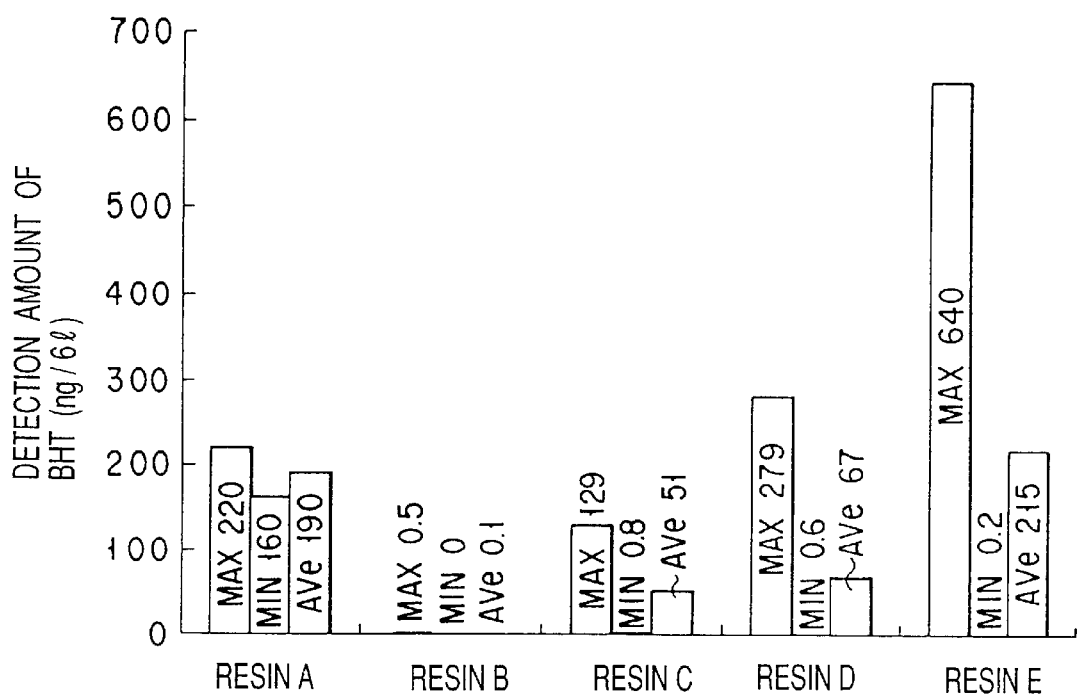
FIG. 10 is a graph illustrating the result of measurement regarding the detection amount of butyl hydroxytoluene (BHT) (maximum, minimum and average) released from each of the resin base materials.

FIG. 10 is a graph illustrating the results of measurement of the detection amount of BHT released from each resin base material. The type of resin base material is plotted on the abscissa, whereas the maximum, minimum and average values of the detection amount (ng/6 liters) of BHT released from each resin base material are plotted on the ordinate. The detection conditions for BHT were as follows. That is, the sample resins A to E were heated to 120° C. in the sealed container, and then clean air was supplied thereto. Thus, the amount of BHT contained in 6 liter of the air was measured by the gas chromatography. The maximum, minimum and average values of the amount of BHT detected for the resin A were 220 ng, 160 ng and 190 ng, respectively, those of the resin B were 0.5 ng, zero (not detected) ng and 0.1 ng, respectively, those of the resin C were 129 ng, 0.8 ng and 51 ng, respectively, those of the resin D were 279 ng, 0.6 ng and 67 ng, respectively, and those of the resin E were 640 ng, 0.2 ng and 215 ng, respectively.

Figure 11:
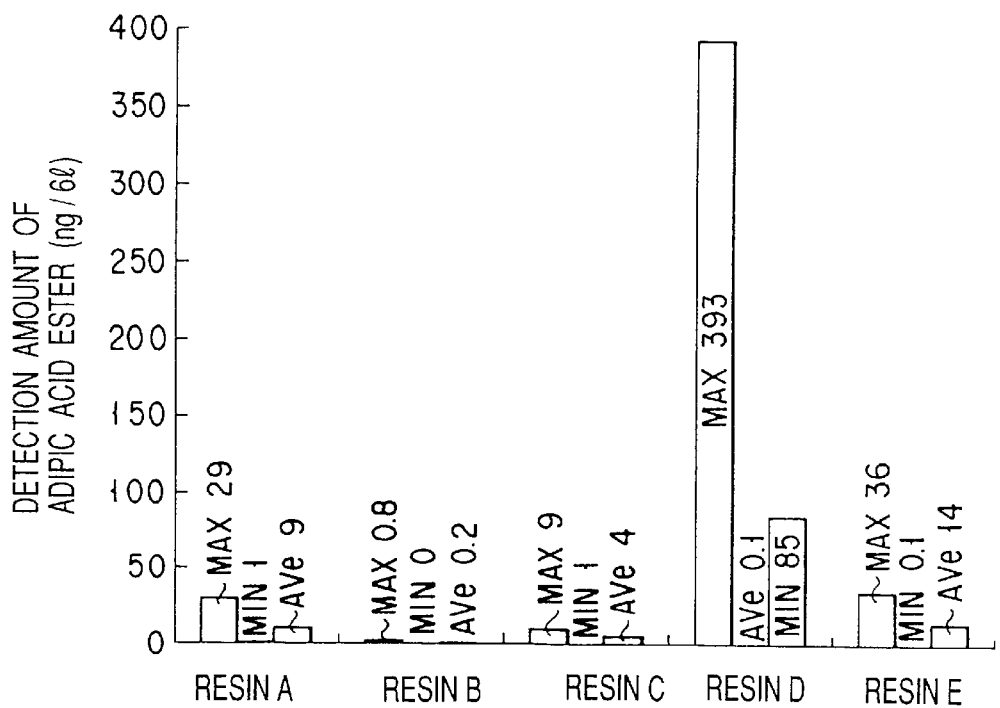
FIG. 11 is a graph illustrating the result of measurement regarding to the detection amount of adipate ester (maximum, minimum and average) released from each of the resin base materials.

FIG. 11 is a graph illustrating the results of measurement of the detection amount of adipic acid ester released from each resin base material. The type of resin base material is plotted on the abscissa, while the maximum, minimum and average values of the detection amount (ng/6 liters) of adipic acid ester released from each resin base material are plotted on the ordinate. The detection conditions for adipic acid ester were as follows. That is, the sample resins A to E were heated to 120° C. in the sealed container, and then clean air was supplied thereto. Thus, the amount of adipic acid ester contained in 6 liter of the air was measured by the gas chromatography. The maximum, minimum and average values of the amount of adipic acid ester detected for the resin A were 29 ng, 1 ng and 9 ng, respectively, those of the resin B were 0.8 ng, zero (not detected) ng and 0.2 ng, respectively, those of the resin C were 9 ng, 1 ng and 4 ng, respectively, those of the resin D were 393 ng, 0.1 ng and 85 ng, respectively, and those of the resin E were 36 ng, 0.1 ng and 14 ng, respectively.

Figure 12:
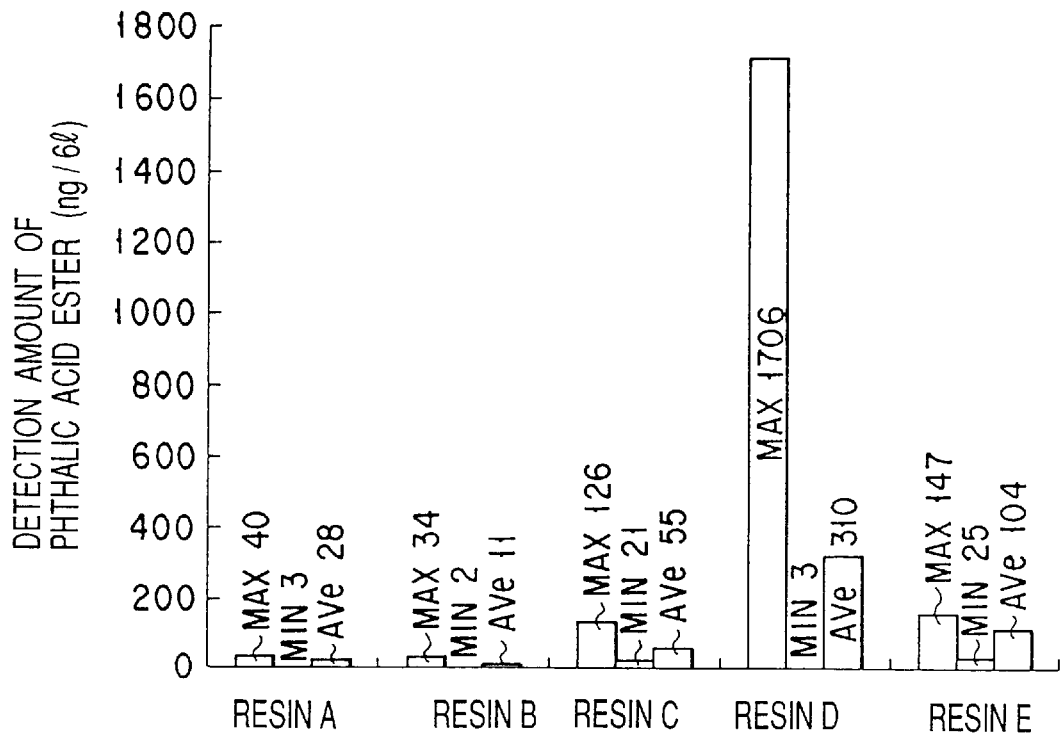
FIG. 12 is a graph illustrating the result of measurement regarding to the detection amount of phthalate ester (maximum, minimum and average) released from each of the resin base materials.

FIG. 12 is a graph illustrating the results of measurement of the detection amount of phthalic acid ester released from each resin base material. The type of resin base material taken in the abscissa, while the maximum, minimum and average values of the detection amount (ng/6 liters) of phthalic acid ester released from each resin base material are plotted on the ordinate. The detection conditions for phthalic acid ester were as follows. That is, the sample resins A to E were heated to 120° C. in the sealed container, and then clean air was supplied thereto. Thus, the amount of phthalic acid ester contained in 6 liter of the air was measured by the gas chromatography. The maximum, minimum and average values of the amount of phthalic acid ester detected for the resin A were 40 ng, 3 ng and 28 ng, respectively, those of the resin B were 34 ng, 2 ng and 11 ng, respectively, those of the resin C were 126 ng, 21 ng and 55 ng, respectively, those of the resin D were 1706 ng, 3 ng and 310 ng, respectively, and those of the resin E were 147 ng, 25 ng and 104 ng, respectively.

Figure 13:
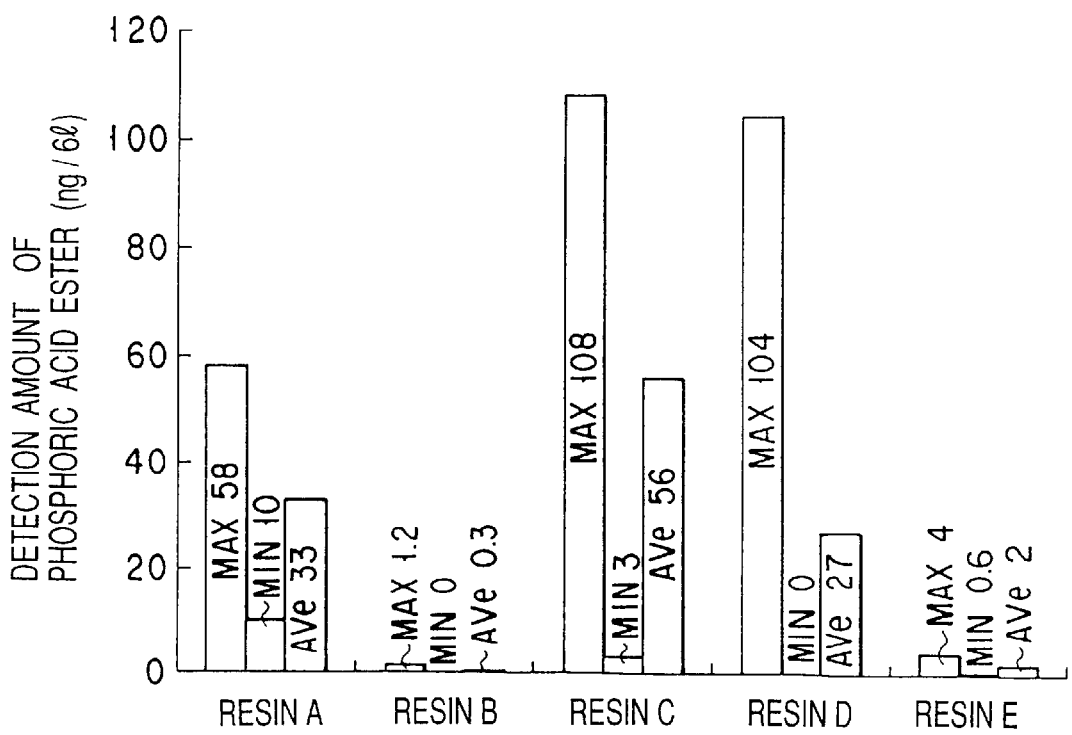
FIG. 13 is a graph illustrating the result of measurement regarding to the detection amount of phosphate ester (maximum, minimum and average) released from each of the resin base materials.

FIG. 13 is a graph illustrating the results of measurement of the detection amount of phosphoric acid ester released from each resin base material. The type of resin base material is plotted on the abscissa. The maximum, minimum and average values of the detection amount (ng/6 liters) of phosphoric acid ester released from each resin base material are plotted on the ordinate. The detection conditions for phosphoric acid ester were as follows. That is, the sample resins A to E were heated to 12° C. in the sealed container, and then clean air was supplied thereto. Thus, the amount of phosphoric acid ester contained in 6 liter of the air was measured by the gas chromatography. The maximum, minimum and average values of the amount of phosphoric acid ester detected for the resin A were 58 ng, 10 ng and 33 ng, respectively, those of the resin B were 1.2 ng, zero (not detected) ng and 0.3 ng, respectively, those of the resin C were 108 ng, 3 ng and 56 ng, respectively, those of the resin D were 104 ng, zero (not detected) ng and 27 ng, respectively, and those of the resin E were 4 ng, 0.6 ng and 2 ng, respectively.

Figure 14:
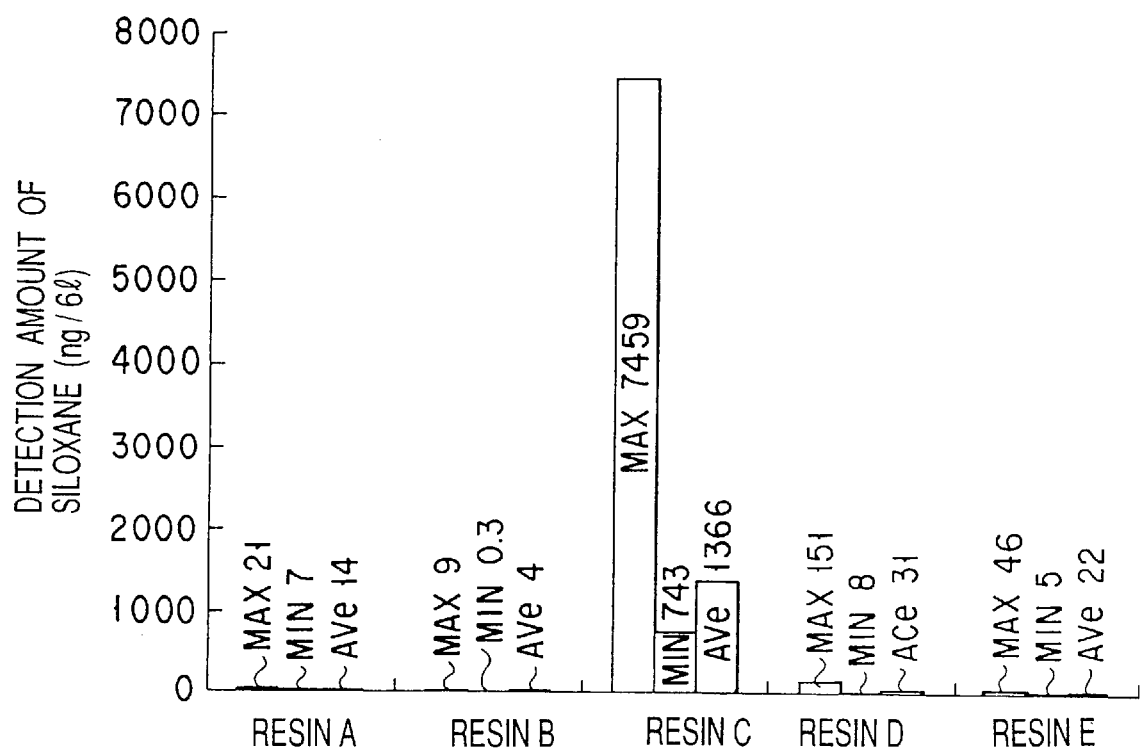
FIG. 14 is a graph illustrating the result of measurement regarding to the detection amount of siloxane (maximum, minimum and average) released from each of the resin base materials.

FIG. 14 is a graph illustrating the results of measurement of the detection amount of siloxane released from each resin base material. The type of resin base material is plotted on the abscissa. The maximum, minimum and average values of the detection amount (ng/6 liters) of siloxane released from each resin base material are plotted on the ordinate. The detection conditions for siloxane were as follows. That is, the sample resins A to E were heated to 120° C. in the sealed container, and then clean air was supplied thereto. Thus, the amount of siloxane contained in 6 liter of the air was measured by the gas chromatography. The maximum, minimum and average values of the amount of siloxane detected for the resin A were 21 ng, 7 ng and 14 ng, respectively, those of the resin B were 9 ng, 0.3 ng and 4 ng, respectively, those of the resin C were 7459 ng, 743 ng and 1366 ng, respectively, those of the resin D were 151 ng, 8 ng and 31 ng, respectively, and those of the resin E were 46 ng, 5 ng and 22 ng, respectively.

Figure 15:
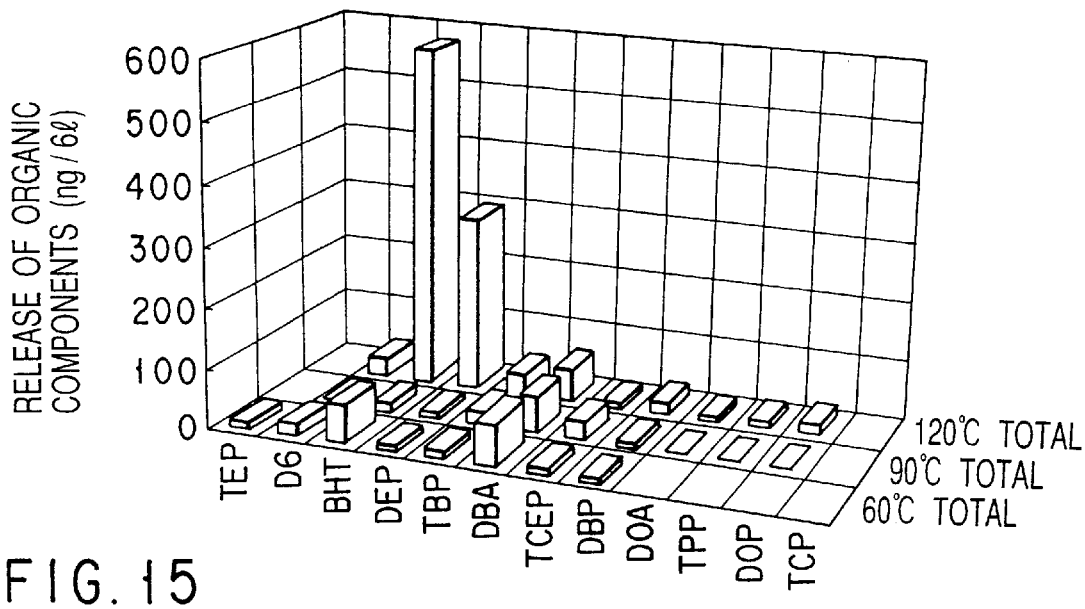
FIG. 15 is a graph illustrating the result of measurement regarding to the release amount of each of the organic components released from resin part sample 1-1, for various temperatures.

FIG. 15 is a three-dimensional graph illustrating the results of the measurements of the amounts of gaseous organic components released at various temperatures of 60° C., 90° C. and 120° C. The type of organic components is plotted on the abscissa, whereas the amount (ng/6 liters) of gaseous organic components released from part sample 1-1 is plotted on the ordinate. The organic components to be analyzed were, from the lightest one to a heavier one in the order, triethyl phosphate (TEP), cyclicsiloxane (D6), butylhydroxy toluene (BHT), diethyl phthalate (DEP), tributyl phosphate (TBP), adipic acid (DBA), trichloroethyl phosphate (TCEP), dibutyl phthalate (DBP), dioctyl adipate (DOA), tripropyl phosphate (TPP), dioctyl phthalate (DOP) and tricresyl phosphate (TCP). From the graph it was clear that both of BHT and DEP had strong temperature dependencies in the amount of gaseous organic components released. That is, the amount of BHT released (total amount of two samples) was 66 ng at 60° C., 14 ng at 90° C. and 574 ng at 120° C., and the amount of DEP released (total amount of two samples) was 6 ng at 60° C., 9 ng at 90° C. and 296 ng at 120° C. Both of BHT and DEP exhibited a high detection value at 120° C.

Figure 16:
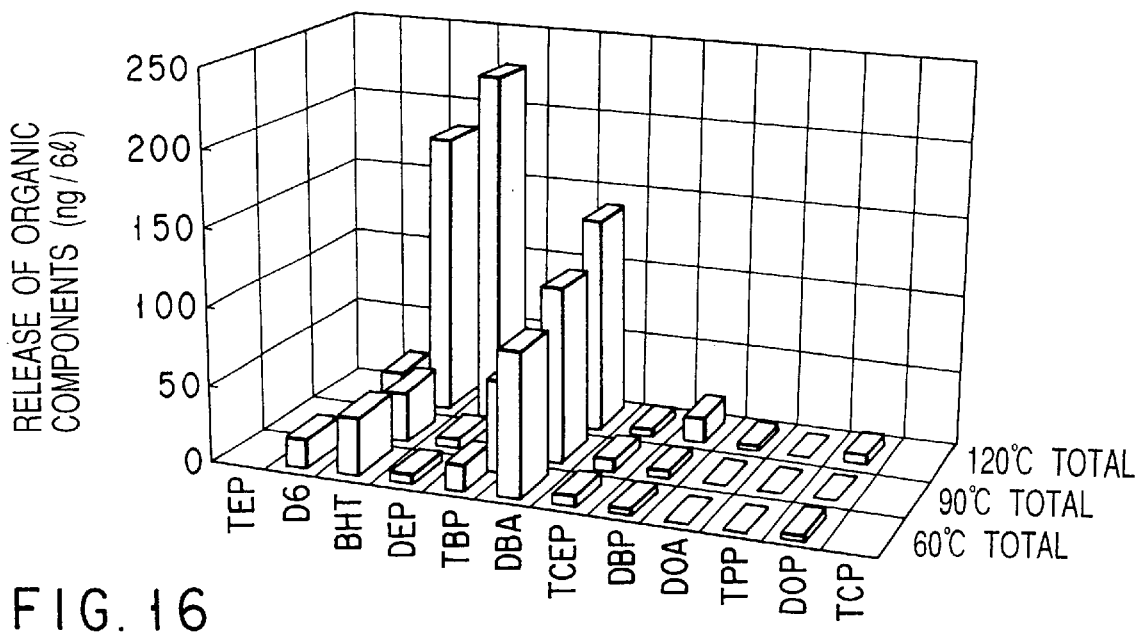
FIG. 16 is a graph illustrating the result of measurement regarding to the release amount of each of the organic components released from resin part sample 1-3, for various temperatures.

FIG. 16 is a three-dimensional graph illustrating the results of the measurements of the amounts of gaseous organic components released at various temperatures of 60° C., 90° C. and 120° C. The type of organic components is plotted on the abscissa, while the amount (ng/6 liters) of gaseous organic components released from part sample 1-3 is plotted on the ordinate. The organic components to be analyzed were the same as those described above. From the graph it was clear that both of BHT and DEP had strong temperature dependencies in the amount of gaseous organic component released. More specifically, the amount of BHT released (total amount of two samples) was 38 ng at 60° C., 33 ng at 90° C. and 183 ng at 120° C., and the amount of DEP released (total amount of two samples) was 6 ng at 60° C., 6 ng at 90° C. and 227 ng at 120° C. Especially, BHT exhibited a high detection value at 120° C. DBA had high detection values at various temperatures. That is, the amount of DBA released (total amount of two samples) was 92 ng at 60° C., 112 ng at 90° C. and 138 ng at 120° C.

Figure 17:
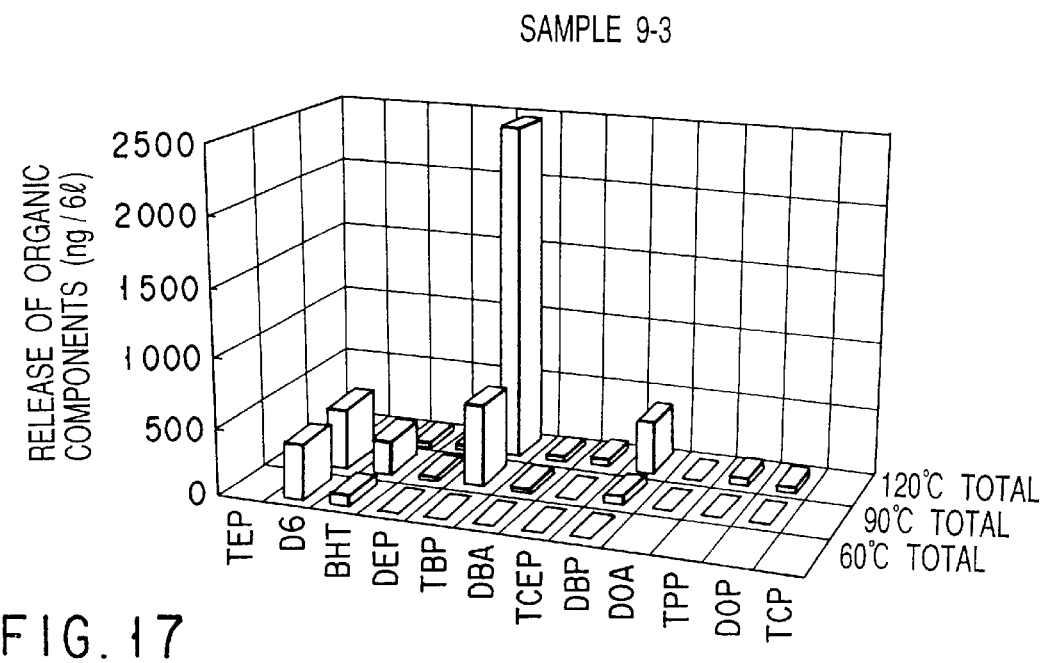
FIG. 17 is a graph illustrating the result of measurement regarding the release amount of each of the organic components released from resin part sample 9-3, at various temperatures.

FIG. 17 is a three-dimensional graph illustrating the results of the measurements of the amounts of gaseous organic components released at various temperatures of 60° C., 90° C. and 120° C. The type of organic compositions is plotted on the abscissa, while the amount (ng/6 liters) of gaseous organic components released from part sample 9-3 is plotted on the ordinate. The organic components to be analyzed were the same as those described above. From the graph, it was clarified that both of TBP and DBP had strong temperature dependencies in the amount of gaseous organic components released. More specifically, the amount of TBP released (total amount of two samples) was 5 ng at 60° C., 601 ng at 90° C. and 246 ng at 120° C., and the amount of DBP released (total amount of two samples) was 7 ng at 60° C., 67 ng at 90° C. and 404 ng at 120° C. Especially, TBP exhibited a high detection value at 120° C. On the other hand, the amount of cyclic siloxane (D6) exhibited a reverse temperature-dependency. That is, the amount of D6 released (total amount of two samples) was 415 ng at 60° C., 454 ng at 90° C. and 27 ng at 120° C.

Figure 18:
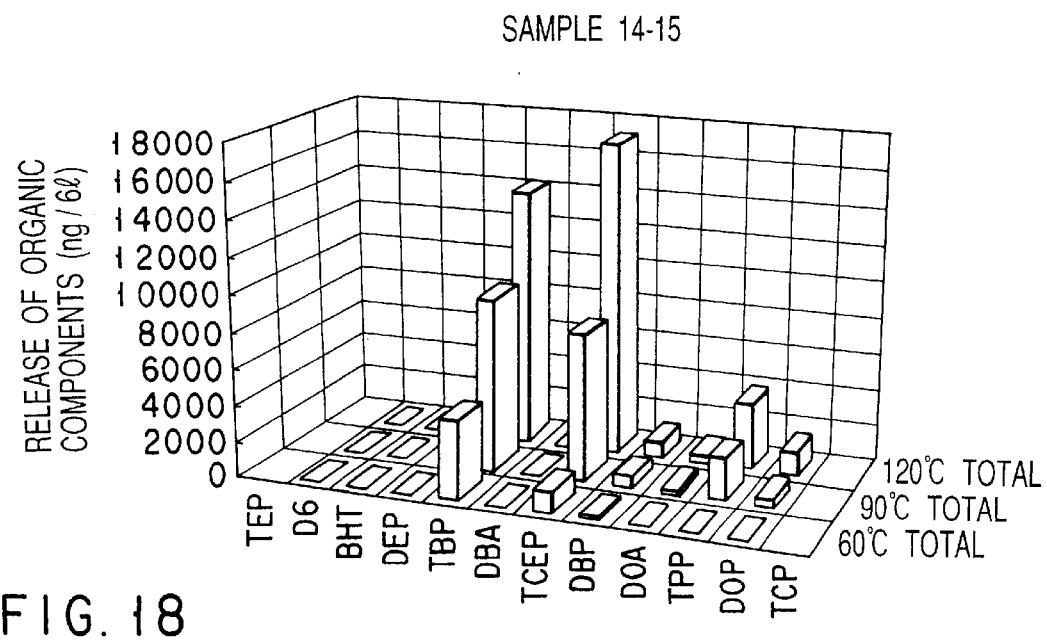
FIG. 18 is a graph illustrating the result of measurement regarding the release amount of each of the organic components released from resin part sample 14-15, at various temperatures.

FIG. 18 is a three-dimensional graph illustrating the results of the measurements of the amounts of gaseous organic components released at various temperatures of 60° C., 90° C. and 120° C. The type of organic components is plotted on the abscissa, while the amount (ng/6 liters) of gaseous organic components released from part sample 14–15 was plotted on the ordinate. The organic components to be analyzed were the same as those described above. From the graph, it was clarified that three of TBP, TCEP and TPP had strong temperature dependencies in the amount of gaseous organic components released. More specifically, the amount of TBP released (total amount of two samples) was 4328 ng at 60° C., 9405 ng at 90° C. and 14104 ng at 120° C., the amount of TCEP released (total amount of two samples) was 1097 ng at 60° C., 8032 ng at 90° C. and 17120 ng at 80° C., and the amount of TPP released (total amount of two samples) was 11 ng at 60° C., 2185 ng at 90° C. and 3714 ng at 120° C. Especially, both of TBP and TCEP exhibited a high detection value in a temperature region of 80° C. 90° C. or higher.

In each of the above examples, the descriptions of the anti-electrostatic agent and/or anti-oxidizing agent were omitted; however in the present invention, both are essential and must be contained. As it would be easily understood, in each of the examples, arbitrary materials of those listed in the section of Best Mode of Carrying out the Invention, can be used.

The above-described examples were described in connection with the cases where substrates to be processed were semiconductor wafers. Nonetheless, the present invention is not limited to these examples. Rather, it can be applied to some other substrates, for example, a glass substrate for a liquid crystal display device.

Further, these examples are described in connection with substrate processing machines that are batch-mode vertical-type furnaces. Nevertheless, the present invention is not limited to these examples. It can be applied to some other machines such as a single-type furnace, a sputtering machine, an ion injection machine, a wet-cleaning machine and a dry-cleaning machine.

INDUSTRIAL APPLICABILITY

In the electronic/electric parts and the substrate processing machine, according to the present invention, which are to be used in a clean room, the release of gaseous organic substances is suppressed. The amount of the organic substances adsorbed onto the surface of the substrate can therefore be significantly reduced. In particular, in the case of parts placed under a circumstance of a temperature higher than room temperature, the release of gaseous organic substances is suppressed. Therefore, they are suitable for the peripheral parts of a thermal oxidation furnace or CVD furnace, or the peripheral parts of the hot plate of a baking unit. According to the present invention, the contamination of various substrates with organic substances can be effectively avoided in the manufacture of semiconductor devices. The yield of the products can be therefore improved.

What is claimed is:

1. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the lubricant is at least one compound selected from the group consisting of aliphatic hydrocarbons having 20 or more carbon atoms, and higher alcohols having 18 or more carbon atoms;

whereby each one of the plurality additives hardly releases any gaseous organic components from the resin base material during the substrate processing under the controlled atmosphere of the clean room when the electronic/electric part is used.

2. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the lubricant is at least one compound selected from the group consisting of micro-crystalline wax, natural paraffin, synthesized paraffin, polyolefin wax, synthesized branched higher alcohols having 18, 20 and 24 carbon atoms and oleyl alcohol;

whereby each one of the plurality additives hardly releases any gaseous organic components from the resin base material during the substrate processing under the controlled atmosphere of the clean room when the electronic/electric part is used.

3. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the plasticizer is at least one compound selected from the group consisting of a carboxylic acid ester having a molecular weight of 400 or higher, a polyester having a molecular weight of 400 or higher, and an epoxy compound having a molecular weight of 400 or higher;

whereby each one of the plurality additives hardly releases any gaseous organic components from the resin base material during the substrate processing under the controlled atmosphere of the clean room when the electronic/electric part is used.

4. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the plasticizer is at least one compound selected from the group consisting of a phthalate compound, a dibasic fatty acid ester, a trimellitate compound, a polyester compound, and an epoxy compound;

whereby each one of the plurality additives hardly releases any gaseous organic components from the resin base material during the substrate processing under the controlled atmosphere of the clean room when the electronic/electric part is used.

5. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the fire retardant is an organic compound having a molecular weight of 300 or higher, except for phosphates ester;

whereby each one of the plurality additives hardly releases any gaseous organic components from the resin base material during the substrate processing under the controlled atmosphere of the clean room when the electronic/electric part is used.

6. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the resin base material is at least one compound selected from the group consisting of polyvinyl chloride), polypropylene, polyethylene, poly(methyl methacrylate), polyethylene terephthalate), poly (butylene terephthalate), polycarbonate, polyphenylene ether, polyallylate, poly(ether sulfone,), polysulfone, poly(phenylene sulfide), polyacetal, polystylene, polyamide, polyimide, poly(ether ether ketone), fluorine resin, epoxy resin, urethane resin, and paper;

whereby each one of the plurality additives hardly releases any gaseous organic components from the resin base material during the substrate processing under the controlled atmosphere of the clean room when the electronic/electric part is used.

7. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the water repellent is silicone oil from which cyclic siloxanes having 10 or less silicon atoms have been removed by a vacuum heating;

whereby each one of the plurality additives hardly releases any gaseous organic components from the resin base material during the substrate processing under the controlled atmosphere of the clean room when the electronic/electric part is used.

8. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, wherein the part is either one of a sheath for electric wiring cable, a sheath for a communication wire, a box and cover for an electronic device, a semiconductor element package, a sealing member and a printed circuit board;

whereby each one of the plurality additives hardly releases any gaseous organic components from the resin base material during the substrate processing under the controlled atmosphere of the clean room when the electronic/electric part is used.

9. An electronic/electric part for use in a clean room for processing a semiconductor device substrate, the clean room having a controlled atmosphere, the electronic/electric part comprises:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent, whereby each one of the plurality additives hardly releases any gaseous organic components from the resin base material during the substrate processing under the controlled atmosphere of the clean room when the electronic/electric part is used in a temperature range where the surface temperature of the part is 80° C. or less.

10. A substrate processing apparatus having a plurality of electronic/electric parts for an electric substrate processing system, each of the electronic/electric parts comprising:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent;

wherein the lubricant is at least one compound selected from the group consisting of aliphatic hydrocarbons having 20 or more carbon atoms, and higher alcohols having 18 or more carbon atoms;

whereby each one of the plurality additives hardly releases any gaseous organic components from the resin base material during the substrate processing under the controlled atmosphere of the clean room when the electronic/electric part is used.

11. A substrate processing apparatus having a plurality of electronic/electric parts for an electric substrate processing system, each of the electronic/electric parts comprising:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent;

wherein the lubricant is at least one compound selected from the group consisting of micro-crystalline wax, natural paraffin, synthesized paraffin, polyolefin wax, synthesized branched higher alcohols having 18, 20 and 24 carbon atoms and oleyl alcohols;

whereby each one of the plurality additives hardly releases any gaseous organic components from the resin base material during the substrate processing under the controlled atmosphere of the clean room when the electronic/electric part is used.

12. A substrate processing apparatus having a plurality of electronic/electric parts for an electric substrate processing system, each of the electronic/electric parts comprising:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent;

wherein the plasticizer is at least one compound selected from the group consisting of a carboxylic ester having a molecular weight of 420 or higher, a polyester having a molecular weight of 400 or higher, and an epoxy compound having a molecular weight of 400 or higher;

whereby each one of the plurality additives hardly releases any gaseous organic components from the resin base material during the substrate processing under the controlled atmosphere of the clean room when the electronic/electric part is used.

13. A substrate processing apparatus having a plurality of electronic/electric parts for an electric substrate processing system, each of the electronic/electric parts comprising:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent;

wherein the plasticizer is at least one compound selected from the group consisting of a phthalate compound, a fatty dibasic acid ester compound, a trimellitate compound, a polyester polymer compound, and an epoxy compound;

whereby each one of the plurality additives hardly releases any gaseous organic components from the resin base material during the substrate processing under the controlled atmosphere of the clean room when the electronic/electric part is used.

14. A substrate processing apparatus having a plurality of electronic/electric parts for an electric substrate processing system, each of the electronic/electric parts comprising:

a resin base material; and a plurality of additives, at least some of the additives are added to the resin base material, the plurality of additives include an anti-electrostatic agent of a nitrogen-containing nonionic compound having a molecular weight of 350 or higher, an anti-oxidizing agent of phenolic compound having a molecular weight of 300 or higher, and one or more materials selected from the group consisting of a lubricant, a plasticizer, a fire retardant, and a water repellent;

wherein the fire retardant is an organic compound having a molecular weight of 300 or higher, except for phosphates;

whereby each one of the plurality additives hardly releases any gaseous organic components from the resin base material during the substrate processing under the controlled atmosphere of the clean room when the electronic/electric part is used.

* * * * *